United States Patent
Goto et al.

(10) Patent No.: US 9,031,589 B2
(45) Date of Patent: May 12, 2015

(54) TRANSMISSION APPARATUS, WIRELESS COMMUNICATION SYSTEM, MOBILE STATION APPARATUS CONTROL PROGRAM, AND BASE STATION APPARATUS CONTROL PROGRAM

(75) Inventors: Jungo Goto, Osaka (JP); Yasuhiro Hamaguchi, Osaka (JP); Kazunari Yokomakura, Osaka (JP); Osamu Nakamura, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 331 days.

(21) Appl. No.: 13/504,912

(22) PCT Filed: Aug. 10, 2010

(86) PCT No.: PCT/JP2010/063561
§ 371 (c)(1),
(2), (4) Date: Jun. 27, 2012

(87) PCT Pub. No.: WO2011/052280
PCT Pub. Date: May 5, 2011

(65) Prior Publication Data
US 2012/0258762 A1  Oct. 11, 2012

(30) Foreign Application Priority Data
Oct. 29, 2009  (JP) ................. 2009-249414

(51) Int. Cl.
*H04B 1/00* (2006.01)
*H04B 7/00* (2006.01)
(Continued)

(52) U.S. Cl.
CPC .............. *H04L 27/2636* (2013.01); *H04B 7/04* (2013.01); *H04L 27/2614* (2013.01); *H04W 4/18* (2013.01);
(Continued)

(58) Field of Classification Search
CPC ............ H04L 27/2615; H04L 27/2621; H04B 1/0483
USPC .......... 455/101, 522, 450–452.1, 509, 68–69, 455/102–104, 500, 507; 375/260, 267, 299; 370/329–330, 341
See application file for complete search history.

(56) References Cited

U.S. PATENT DOCUMENTS
7,961,800 B2  6/2011  Yoshida
8,073,405 B2  12/2011  Tougou
(Continued)

FOREIGN PATENT DOCUMENTS
JP  2005-252509 A  9/2005
JP  2007-158913 A  6/2007
(Continued)

OTHER PUBLICATIONS
3rd Generation Partnership Project; Technical Specification Group Radio Access Network; Evolved Universal Terrestrial Radio Access (E-UTRA); Physical Channels and Modulation (Release 8), 3GPP TS 36.211 V8.7.0 (May 2009).
(Continued)

*Primary Examiner* — Simon Nguyen
(74) *Attorney, Agent, or Firm* — Birch, Stewart, Kolasch & Birch, LLP

(57) ABSTRACT

A mobile station apparatus includes a plurality of PAs (Power Amplifiers) and a plurality of antennas and transmission performances thereof is to be improved when transmission signals having peak powers different from one another are transmitted through the use of the respective antennas. A transmission apparatus includes a plurality of PAs and a plurality of antennas and transmits a signal having a high peak power, by means of determining a transmission signal to be transmitted through the use of each of the PAs based on the capability of each of the PAs, converting the transmission signal into a frequency signal by time-frequency conversion, dividing the frequency signal into a plurality of clusters, and allocating the clusters to bands non-contiguously. Furthermore, the transmission apparatus transmits a signal having a low peak power by means of allocating the frequency signal to continuous bands.

12 Claims, 14 Drawing Sheets

(51) Int. Cl.
  *H04B 1/02* (2006.01)
  *H04L 27/26* (2006.01)
  *H04B 7/04* (2006.01)
  *H04W 4/18* (2009.01)
  *H04W 52/42* (2009.01)
  *H04W 72/04* (2009.01)
  *H04W 88/00* (2009.01)
  *H04W 52/34* (2009.01)

(52) U.S. Cl.
  CPC ........... *H04W 52/42* (2013.01); *H04W 72/0453* (2013.01); *H04W 88/00* (2013.01); *H04W 52/34* (2013.01)

(56) References Cited

U.S. PATENT DOCUMENTS

| | | | | |
|---|---|---|---|---|
| 8,379,536 | B2* | 2/2013 | Montojo et al. | 370/252 |
| 2005/0197066 | A1 | 9/2005 | Maruyama | |
| 2007/0129024 | A1 | 6/2007 | Kikuma | |
| 2008/0096574 | A1* | 4/2008 | Khandekar et al. | 455/452.2 |
| 2008/0304588 | A1* | 12/2008 | Pi | 375/260 |
| 2009/0232194 | A1 | 9/2009 | Yoshida | |
| 2010/0091900 | A1* | 4/2010 | Gan | 375/267 |
| 2010/0091919 | A1* | 4/2010 | Xu et al. | 375/346 |
| 2010/0184393 | A1 | 7/2010 | Tougou | |
| 2010/0272048 | A1* | 10/2010 | Pan et al. | 370/329 |
| 2011/0038271 | A1* | 2/2011 | Shin et al. | 370/252 |
| 2011/0076962 | A1* | 3/2011 | Chen et al. | 455/68 |
| 2011/0085588 | A1* | 4/2011 | Zhuang et al. | 375/219 |
| 2011/0228878 | A1* | 9/2011 | Sorrentino | 375/295 |
| 2011/0275405 | A1* | 11/2011 | Backman et al. | 455/522 |

FOREIGN PATENT DOCUMENTS

| | | |
|---|---|---|
| WO | WO 2007/029406 A1 | 3/2007 |
| WO | WO 2009/004733 A1 | 1/2009 |

OTHER PUBLICATIONS

Alcatel-Lucent Shanghai Bell, Alcatel-Lucent, "CM/PAPR Reduction of Aggregated Carriers for Uplink of LTE-Advanced", 3GPP TSG RAN WG1 Meeting #58 R1-093363/Aug. 24-28, 2009 <http://www.3gpp.org/ftp/tsg_ran/WG1_RL1/TSGR1_58/Docs/R1-093363.zip>.

Ericsson, "Carrier aggregation"; TSG-RAN WG1 #54bis R1-083750, Sep. 29-Oct. 3, 2008 <http://ww.3gpp.org/ftp/tsg_ran/WG1_RL1/TSGR1_54b/Docs/R1-083750.zip>.

InterDigital Communications, LLC, "CM Analysis of UL Transmission for LTE-A", 3GPP TSG-RAN WG1 Meeting #54 R1-082807, Aug. 18-22, 2008 <http://www.3gpp.org/ftp/tsg_ran/WG1_RL1/TSGR1_54/Docs/R1-082807.zip>.

International Search Report issued in PCT Application No. PCT/JP2010/063561.

NTT DOCOMO, "UL MIMO TRansmission Schemes in LTE-Advanced", 3GPP TSG RAN WG1 Meeting #55 R1-084250, Novemer 10-14, 2008 <http://www-3gpp.org/ftp/tsg_ran/WG1-RL1/TSGR1/58/Docs/R1-084250.zip>.

Panasonic, "Comparison between Clustered DFT-s-OFDM and OFDM for supporting non-contiguous RB alocation within a component carrier", 3GPP TSG RAN WG1 Meeting #55 R1-084583, Nov. 10-14, 2008 <http://www.3gpp.org/ftp/tsg_ran/wG1_RL1/TSGR1_55/docs/R1-084583.zip>.

Research in Motion, Limited, "On LTE-A Uplink Transmission Scheme in one Component Carrier", 3GPP TSG RAN WG1 Meeting #55bis, R1-090025, Jan. 12-16, 2009 <http://www.3gpp.org/ftp/tsg_ran/wG1_RL1/TSGR1_55b/Docs/R1-090025.zip>.

Panasonic, "System Performance of Uplink Non-Contiguous Resource Allocation", 3GPP TSG RAN WG1 Meeting #55, R1-084582, Prague, Czech Republic, Nov. 10-14, 2008, 5 pages.

* cited by examiner

TRANSMISSION APPARATUS, WIRELESS COMMUNICATION SYSTEM, MOBILE STATION APPARATUS CONTROL PROGRAM, AND BASE STATION APPARATUS CONTROL PROGRAM

TECHNICAL FIELD

The present invention relates to a transmission apparatus, a wireless communication system, a mobile station apparatus control program, and a base station apparatus control program, in which a transmission signal allocation method is switched in consideration of power amplifier capacity.

BACKGROUND ART

Uplink of mobile communication (communication from a mobile station apparatus to a base station apparatus) is subject to a strict restriction on power consumption compared to downlink (communication from the base station apparatus to the mobile station apparatus) and the number of antennas to be used for transmission is determined to be one for the uplink in LTE (Long Term Evolution) which is a wireless communication system of the 3.9th generation mobile phone.

Recently, standardization is being carried out for LTE-A (LTE-Advanced) which is the 4th generation wireless communication system further advanced from the LTE system. In the uplink of the LTE-A system, there is being discussed introduction of transmission diversity and multi-input multi-output (MIMO) techniques in which multi-antenna transmission is performed while keeping the maximum transmission power of the mobile station apparatus 23 dB which is the same as that of LTE, from the viewpoint of improving a peak data rate and spectrum efficiency. In contrast, when the mobile station apparatus always uses an access method by multi-antennas, since there is a case of increasing power consumption such as a case in which transmission of a channel estimation signal is required for each antenna, there is also discussed a single antenna mode using only one antenna.

Meanwhile, in the uplink of the LTE-A system there is employed Clustered DFT-S-OFDM (Dynamic Spectrum Control (DSC), also referred to as DFT-S-OFDM with SDC (Spectrum Division Control)), which focuses on backward compatibility with LTE, which supports DFT-S-OFDM (Discrete Fourier Transform Spread Orthogonal Frequency Division Multiplexing, also referred to as SC-FDMA) signal that is a single carrier signal (Non-patent document 1) and which can furthermore improve throughput. The Clustered DFT-S-OFDM is a method in which a single carrier spectrum is divided (each of the divided spectra is called a cluster) and the respective clusters are allocated non-contiguously. The Clustered DFT-S-OFDM, while having a peak power higher than the DFT-S-OFDM, selects a frequency having a high channel gain from available bands, and thus can obtain a high frequency selection diversity effect.

The peak power in the present specification expresses a PAPR (Peak to Average Power Ratio) or the like which is a ratio of a peak power to an average power. Each cluster includes an integer multiple of resource blocks each of which groups 12 subcarriers and the frequency selection diversity effect becomes higher as the number of the resource blocks constituting the cluster becomes smaller. However, the present invention can be applied even when the cluster includes an integer multiple of the subcarriers.

PRIOR ART DOCUMENT

Non-Patent Document

Non-patent document 1: 3GPP TS 36.211 (V8.7.0) "Evolved Universal Terrestrial Radio Access (E-UTRA) Physical Channels and Modulation"

DISCLOSURE OF THE INVENTION

Problem to be Solved by the Invention

When total transmission power from two antennas is set to 23 dBm, the transmission power per antenna becomes 20 dBm, and thus the capacity of a PA (Power Amplifier) of a mobile station apparatus is considered to be set to 20 dBm. Here, the capacity of the PA in the present specification means a 1 dB compression point of the PA, or an output power of the PA at the time of 1-dB gain compression, or the like, and indicates a capability of the PA. In contrast, there are considered various configurations for the PA such as a configuration in which the mobile station apparatus includes PAs having capacities different from one another, from a view point of enabling the 23 dBm also to be supported, as to the maximum transmission power of the mobile station in a single antenna mode. For example, there are a case in which the mobile station apparatus includes a plurality of 23 dBm PAs, a case in which the mobile station apparatus includes a 23 dBm PA and a 20 dBm PA, and the like.

However, in a case in which the mobile station apparatus includes a plurality of PAs, and a total value of allowable transmission power values of the PAs in the mobile station apparatus is larger than a maximum allowable transmission power value of the mobile station, when switching between the Clustered DFT-S-OFDM and the DFT-S-OFDM is performed or when transmission signals having different peak power values such as those in multi-antenna transmission or multi-carrier transmission are allocated without consideration of the allowable transmission power values of the PA, there arises a problem in which distortion is caused by non-linearity of the PA and transmission performances are degraded.

The present invention has been achieved in view of such a situation, and aims to provide a transmission apparatus, a wireless communication system, a mobile station apparatus control program, and a base station apparatus control program, in which, when the mobile station having a plurality of PAs and transmission signals having different peak powers are transmitted through the use of the respective PAs, improvement of transmission performances can be realized by means of performing allocation so as to cause the transmission signal having a high peak power to be transmitted from the PA having a higher capacity.

Means for Solving the Problem (1) For achieving the above purpose, the present invention took the following measures. That is, a transmission apparatus of the present invention is a transmission apparatus including a plurality of PAs (Power Amplifiers) and a plurality of antennas, wherein a transmission signal to be transmitted through the use of each of the PAs is determined based on the capability of each of the PAs and signals having PAPR (Peak to Average Power Ratio) characteristics different form one another are transmitted from the respective antennas.

In this manner, the transmission apparatus determines the transmission signal to be transmitted from each of the PAs based on the capability of each of the PAs and transmits the signals having the different PAPR (Peak to Average Power Ratio) from the respective antennas, and thus it is possible to use the PAs based on the PAPR characteristics and to determine transmission power without consideration of back-off, for example, and it is possible to improve transmission performances.

(2) Furthermore, in the transmission apparatus of the present invention, a signal for converting the transmission signal into a frequency signal by time-frequency conversion, dividing the frequency signal into a plurality of clusters, and allocating the frequency signal to bands non-contiguously is set as at least one of the signals having the PAPR characteristics different from one another to be transmitted.

In this manner, the signal for dividing the frequency signal into a plurality of clusters and allocating the frequency signal to the bands non-contiguously is set as at least one of the signals having the different PAPR characteristics to be transmitted, and thus it is possible to determine the transmission power without consideration of the back off and always to perform discrete band allocation by using the PA which has a large capacity for the signal which has a high peak power when the mobile station apparatus performs transmission using the plurality of PAs. Accordingly, it becomes unnecessary to be notified of contiguous band allocation information in the case of the PA having a large capacity, and it is also possible to reduce the number of formats in control information to be subjected to blind decoding.

(3) Furthermore, in the transmission apparatus of the present invention, a signal for converting the transmission signal into a frequency signal by time-frequency conversion and allocating the frequency signal to contiguous bands is set as at least one of the signals having the PAPR characteristics different from one another to be transmitted.

In this manner, the signal for allocating the frequency signal to the contiguous bands is set as at least one of the signals having the different PAPR characteristics to be transmitted, and thus the mobile station apparatus can use the PA having a small capacity for the signal having a low peak power in performing transmission using the plurality of PAs, and only notification of the format of the control information indicating the contiguous band allocation may be received from a base station. Accordingly, it is also possible to reduce the number of the formats in the control information to be subjected to the blind decoding, for the PA having a small capacity.

(4) Furthermore, in the transmission apparatus of the present invention, the frequency signal is divided into the clusters and signals having cluster sizes different from one another are transmitted as the signals having the PAPR characteristics different from one another.

In this manner, the transmission apparatus divides the frequency signal into the clusters and transmits the signals having different cluster sizes as the signals having different PAPR characteristics, and thus it is possible to use the PA having a large capacity for a cluster signal having a narrow bandwidth in which the peak power becomes high, to determine the transmission power without consideration of the back-off, to obtain a high frequency selection diversity effect without increasing the distortion caused by the nonlinearity of the PA, and to improve the transmission performances.

(5) Furthermore, in the transmission apparatus of the present invention, the signals having the PAPR characteristics different from one another are transmitted by means of transmitting signals having the numbers of carriers different from one another to be used for transmission.

In this manner, when the signals having the different numbers of carriers are transmitted as the signals having the different PAPR characteristics, the transmission apparatus adds the control information or allocates a signal having a high peak power in which signals to be transmitted to a plurality of CCs are added to one another, to an antenna which uses the PA having a large capacity, and thus it is not necessary to reduce the transmission power in consideration of the back-off for the antenna which uses the PA having a large capacity, and it is possible to improve the transmission performances.

(6) Furthermore, in the transmission apparatus of the present invention, among the signals having the numbers of carriers different from one another, the signal having a large number of carriers includes a data transmission carrier and a control signal transmission carrier.

In this manner, the signal having a large number of the carriers includes the data transmission carrier and the control signal transmission carrier, and thus, when the mobile station apparatus performs data transmission using a plurality of antennas and needs to perform simultaneous transmission of data and control information, it is not necessary to reduce the transmission power in consideration of the back-off for the antenna which uses the PA having a large capacity by adding the control information to the PA having a large capacity, and it is possible to improve the transmission performances.

(7) Furthermore, in the transmission apparatus of the present invention, the signals having the PAPR characteristics different from one another are transmitted by means of transmitting signals having bandwidths different from one another to which pre-coding vectors are applied.

In this manner, the signals having the different PAPR characteristics are transmitted by means of transmitting the signals having different bandwidths to which the pre-coding vectors are applied. Thereby, since the signal to which the pre-coding is applied in a unit of the cluster is allocated to the antenna which uses the PA having a large capacity when the mobile station apparatus performs the data transmission in the MIMO, it is possible to determine the transmission power without consideration of the back-off of the PA, and, since it becomes easy to separate a spatially-multiplexed signal on a receiving side, it is possible to improve the transmission performances.

(8) Furthermore, in the transmission apparatus of the present invention, the signals having the PAPR characteristics different from one another are transmitted by means of converting the transmission signal into a frequency signal by time-frequency conversion and transmitting the signal subjected to SFBC (Space Frequency Block Code) coding.

In this manner, the signals having the different PAPR characteristics are transmitted by means of converting the transmission signal into the frequency signal by the time-frequency conversion and transmitting the signal subjected to the SFBC (Space Frequency Block Code) coding, and thus, when the mobile station apparatus performs the data transmission using the SFBC, it is not necessary to reduce the transmission power in consideration of the back-off by allocating the signal having the increased peak power by the SFBC coding, to the antenna which uses the PA having a large capacity, and it is possible to improve the transmission performances.

(9) Furthermore, in the transmission apparatus of the present invention, the signals having the PAPR characteristics different from one another are transmitted by means of transmitting a signal obtained by adding a plurality of CC (Component Carrier) signals to one another.

In this manner, the signals having the different PAPR characteristic is transmitted by means of transmitting the signal obtained by adding a plurality of CC signals to one another based on the capacity of each of the PAs, and thus it is not necessary to reduce the transmission power in consideration of the back-off by allocating the signal having a high peak power in which the plurality of CC signals are added to one another to the antenna which uses the PA having a large capacity, and it is possible to improve the transmission performances.

(10) Furthermore, a wireless communication system of the present invention is a wireless communication system which comprises a mobile station apparatus including a plurality of PAs (Power Amplifiers) and a plurality of antennas and a base station apparatus which determines at least one of a transmission method and a frequency band to be used and notifies the mobile station apparatus of the determination result, wherein the mobile station apparatus notifies the base station apparatus of information indicating capability of the PA, and the base station apparatus determines a bandwidth to which a pre-coding vector is applied and a transmission signal which is subjected to phase rotation by the pre-coding vector, based on the capability of the PA, notification of which has been received from the mobile station.

In this manner, the base station apparatus determines the bandwidth to which a pre-coding vector is applied and a transmission signal subjected to phase rotation by the pre-coding vector based on the capability of the PA, notification of which has been received from the mobile station, and thus the mobile station can allocate the signal subjected to pre-coding in a unit of the cluster to the antenna which uses the PA having a large capacity when the mobile station performs the data transmission in the MIMO. Accordingly, it is possible to determine the transmission power without consideration of the back-off of the PA and, since it becomes easy to separate the spatially-multiplexed signal on the receiving side, it is possible to improve the transmission performances.

(11) Furthermore, a wireless communication system of the present invention is a wireless communication system which comprises a mobile station apparatus including a plurality of PAs (Power Amplifiers) and a plurality of antennas and a base station apparatus which determines at least one of a transmission method and a frequency band to be used and notifies the mobile station apparatus of the determination result, wherein the base station apparatus determines at least one of the transmission method and the frequency band for data transmission from the mobile station, based on capability of the PA, notification of which has been received from the mobile station apparatus.

In this manner, the base station apparatus determines at least one of the transmission method and the frequency band for the data transmission from the mobile station apparatus, in accordance with the capability of the PA, notification of which has been received from the mobile station apparatus, and thus the mobile station can determined the transmission power without consideration of the back-off by always performing discrete band allocation for the PA having a large capacity and always performing contiguous band allocation for the PA having a small capacity when the mobile station apparatus performs transmission using the plurality of antennas. Furthermore, in the case of the PA having a large capacity, it becomes unnecessary to provide notification of the control information indicating the contiguous band allocation and it is also possible to reduce the number of the formats in the control information to be subjected to the blind decoding.

(12) Furthermore, a mobile station apparatus control program of the present invention is a control program of a mobile station apparatus which includes a plurality of PAs (Power Amplifiers) and a plurality of antennas, wherein the control program converts a series of processing into commands so as to enable a computer to read and execute them, the series of processing including processing of: determining a transmission signal to be transmitted through the use of each of the PAs based on capability of each of the PAs, and transmitting signals having PAPR (Peak to Average Power Ratio) characteristics different from one another from the respective antennas.

In this manner, the transmission signal to be transmitted through the use of each of the PAs is determined based on the capability of each of the PAs and the signals having different PAPR (Peak to Average Power Ratio) characteristics are transmitted from the respective antennas, and thus it becomes possible to use the PA based on the PAPR characteristic, and it is possible to determine the transmission power without consideration of the back-off, for example, and to improve the transmission performances.

(13) Furthermore, a base station apparatus control program is a base station control program applied to a wireless communication system comprising a mobile station apparatus including a plurality of PAs (Power Amplifiers) and a plurality of antennas and a base station apparatus which determines at least one of a transmission method and a frequency band to be used and notifies the mobile station apparatus of the determination result, wherein the control program converts a series of processing into commands so as to enable a computer to read and execute them, the series of processing including processing of: receiving information indicating capability of the PA from the mobile station apparatus, and determining a bandwidth to which pre-coding vector is applied and a transmission signal which is subjected to phase rotation by the pre-coding vector in accordance with the received information indicating the capability of the PA.

In this manner, the bandwidth to which the pre-coding vector is applied and the signal which is subjected to the phase rotation by the pre-coding vector are determined based on the capability of the PA, notification of which has been received from the mobile station apparatus, and thus the mobile station apparatus can allocate the signal to which the pre-coding is applied in a unit of the cluster to the antenna having a large capacity to be used, when the mobile station apparatus performs the data transmission in the MIMO. Accordingly, it is possible to determine the transmission power without consideration of the back-off for the PA, and since it becomes easy to separate the spatially multiplexed signal on the receiving side, it is possible to improve the transmission performances.

(14) Furthermore, a base station apparatus control program of the present invention is a base station control program applied to a wireless communication system comprising a mobile station apparatus including a plurality of PAs (Power Amplifiers) and a plurality of antennas and a base station apparatus which determines at least one of a transmission method and a frequency band to be used and notifies the mobile station apparatus of the determination result, wherein the control program converts a series of processing into commands so as to enable a computer to read and execute them, the series of processing including processing of: receiving information indicating capability of the PA from the mobile station apparatus, and determining at least one of the transmission method and the frequency band for data transmission from the mobile station, in accordance with the received information indicating the capability of the PA.

In this manner, at least one of the transmission method and the frequency band for the data transmission from the mobile station apparatus is determined based on the capability of the PA, notification of which has been received from the mobile station, and thus the mobile station apparatus can determine the transmission power without consideration of the back-off by always performing the discrete band allocation for the PA having a large capacity and always performing the contiguous band allocation for the PA having a small capacity when the mobile station apparatus performs transmission using the plurality of antennas. Furthermore, it becomes unnecessary to provide the notification of the control information indicating the contiguous band allocation for the PA having a large capacity and it is possible to reduce the number of the formats in the control information to be subjected to the blind decoding.

Advantage of the Invention

According to the present invention, when the mobile station apparatus performs the data transmission using a plurality of antennas, it becomes unnecessary to consider the back-off with respect to the nonlinearity of the PA for a transmission signal having a high peak power, and it becomes possible to transmit the signal having a high peak power at a higher transmission power to improve the transmission performances.

BEST MODES FOR CARRYING OUT THE INVENTION

Figure 1:
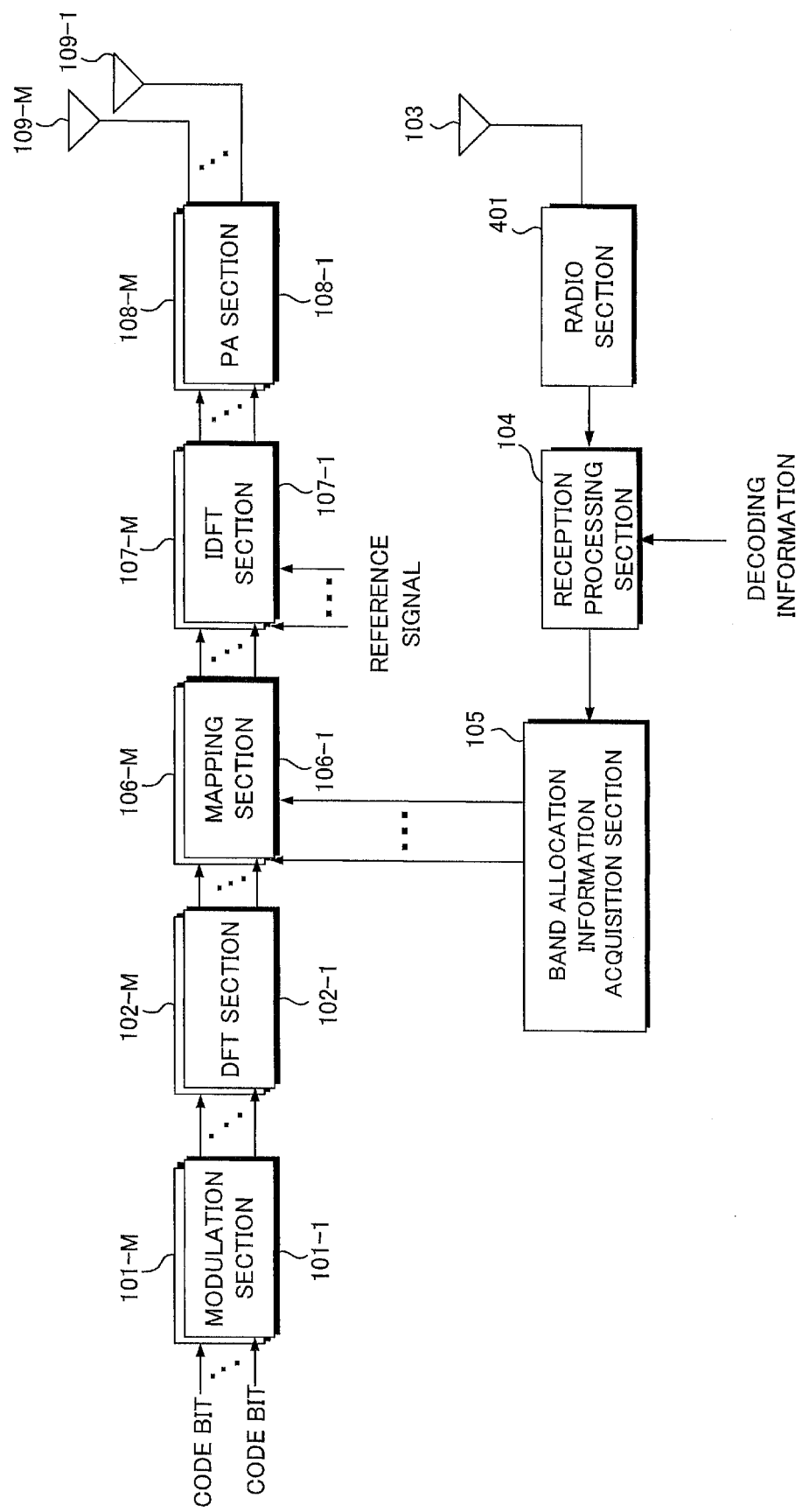
FIG. 1 is a block diagram showing an example of a mobile station apparatus which is a transmission apparatus according to a first embodiment of the present invention.

Hereinafter, embodiments of the present invention will be explained with reference to the drawings. In the present embodiments, a transmission apparatus will be explained as a mobile station apparatus. FIG. 1 is a block diagram showing an example of a mobile station which is a transmission apparatus according to a first embodiment of the present invention. However, FIG. 1 shows necessity minimum blocks for explaining the present invention. The mobile station apparatus has a plurality of PAs and antennas and performs the same processing on each transmission signal, and a signal output from one transmission antenna, which represents the plurality of transmission antennas, will be explained through the use of FIG. 1 (number of the transmission antennas is set as M). Code bits are input into a modulation section 101-1 and modulated into modulation symbols such as QPSK (Quaternary Phase Shift Keying), and 16QAM (16-ary Quadrature Amplitude Modulation), and then converted into frequency-domain signals in a DFT section 102-1. Meanwhile, a reception antenna 103 receives control information sent from a base station and the control information is obtained through the use of preliminarily-informed decoding information in a reception processing section 104, after having been subjected to down-conversion into a base band frequency in a radio section 401. A band allocation information acquisition section 105 inputs band allocation information included in the control information into a mapping section 106-1.

The mapping section 106-1 allocates a frequency domain signal according to the band allocation information input from the band allocation information acquisition section 105. When the band allocation information indicates contiguous bands, the DFT-S-OFDM is used and, when non-contiguous bands are indicated, the Clustered DFT-S-OFDM is used as an access method. The signals subjected to conversion from the frequency domain to the time domain by an IDFT section 107-1 are multiplexed with reference signals to be used for channel estimation. While omitted from the present drawing, the signal is amplified in a PA section 108-1 after having been up-converted from a base band frequency and output from a transmission antenna 109-1 (transmission antennas 109-1 to 109-M is denoted by transmission antenna 109). Hereinafter, in the present embodiments, the signal input into the PA section 108-1 is assumed to be a signal subjected to the up-conversion processing. While not described in the present embodiments, a CP (Cyclic Prefix) may be added to the time domain signal.

When a plurality of antennas is used, it is possible to use the MIMO or the transmission diversity which uses the same frequency at the same time. Furthermore, a band used in LTE is called a component carrier (CC), and, in LTE-A, carrier aggregation (CA), which allocates and unites the plurality of component carriers (CC) along the frequency axis in an LTE-A band and uses the plurality of CCs at the same hour, is supported as a method of expanding the band while maintaining the backward compatibility. Furthermore, also the CA which uses the different CCs at the same hour by using a plurality of antennas could be applied.

In LTE, notification of the control information is provided by a control signal using a downlink wireless resource referred to as PDCCH (Physical Downlink Control Channel), and the base station apparatus notifies the mobile station apparatus of information regarding the band allocation using a field called DCI (Downlink Control Information). The DCI format includes format 0 indicating the contiguous band allocation in the uplink, format 1A indicating the contiguous band allocation in the downlink, format 1 indicating the non-contiguous band allocation in the downlink, and the like. In LTE-A, a format indicating the non-contiguous band allocation in the uplink is further added. The DCI format has a size determined for each of the formats, and the mobile station apparatus obtains the control information by blind decoding which performs decoding by determining which DCI format is used depending on the size.

Figure 2:
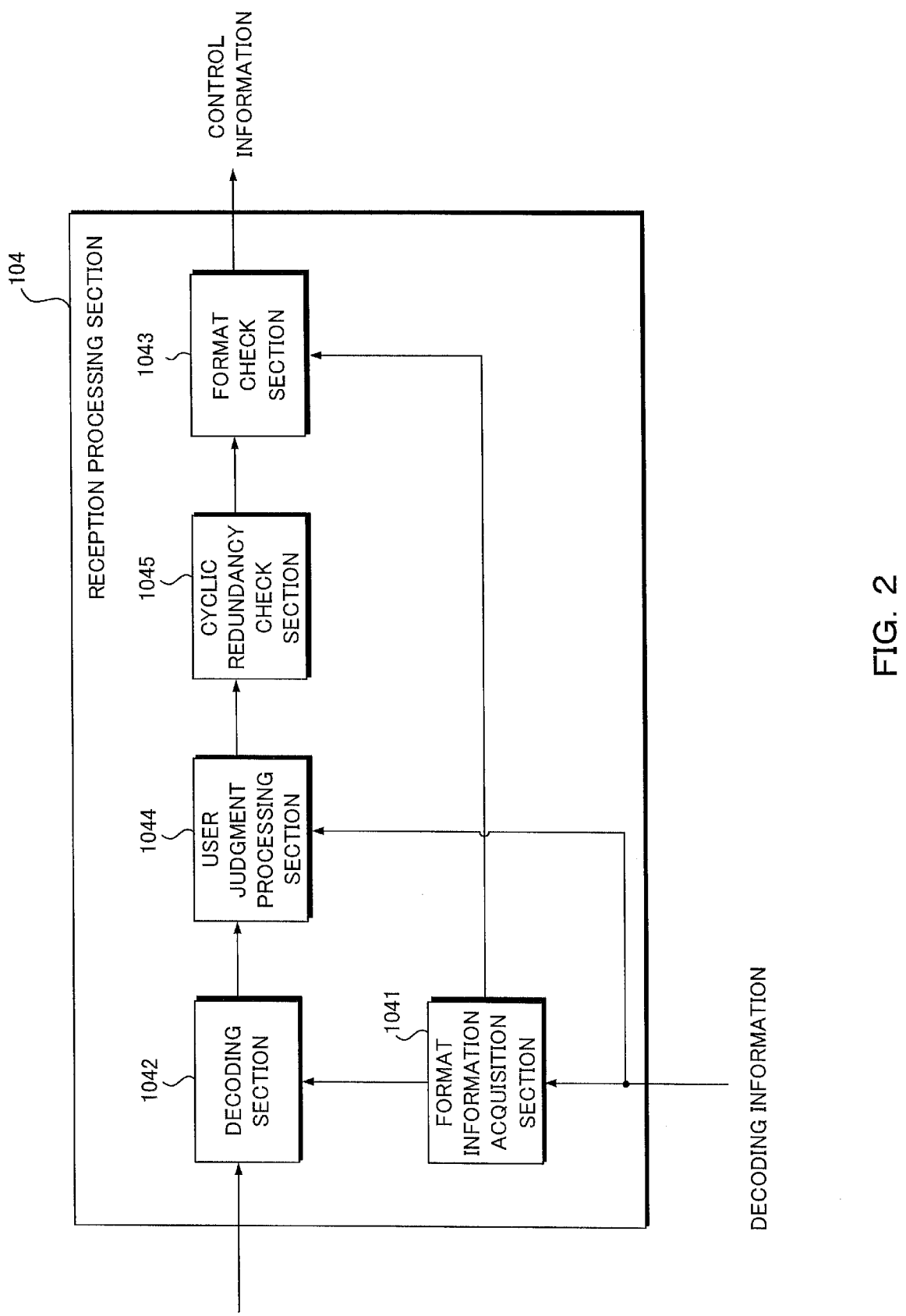
FIG. 2 is a block diagram showing a configuration example of a reception processing section 104 according to a first embodiment of the present invention.

FIG. 2 is a block diagram showing an configuration example of the reception processing section 104 according to the first embodiment of the present invention. The blind decoding will be explained through the use of FIG. 2. In the reception processing section 104, decoding information is preliminarily input in the format information acquisition section 1041. The format information acquisition section 1041 inputs the size of the format to be decoded into a decoding section 1042 and inputs format information into a format check section 1043. The decoding section 1042 performs decoding processing on a received signal according to the format size input from the format information acquisition section 1041, from a candidate at a preliminarily defined frequency position called a search space to which the control information is allocated. A user judgment processing section 1044 operates exclusive OR of a cyclic redundancy check (CRC) bit added to the control information and user ID, and performs masking.

A cyclic redundancy check section 1045 checks whether the decoding result is correct or not, by cyclic redundancy check. When the decoding result is correct, the format check section 1043 confirms the received control information using a bit value which discriminates the formats having the same size. However, when the decoding result is not correct in the cyclic redundancy check section 1045, the information is determined to be information for another user and the same reception processing is performed for another signal in the search space. The above processing is performed repeatedly until the control signal is decoded correctly. The correctly-decoded control information includes the band allocation information.

Figure 3:
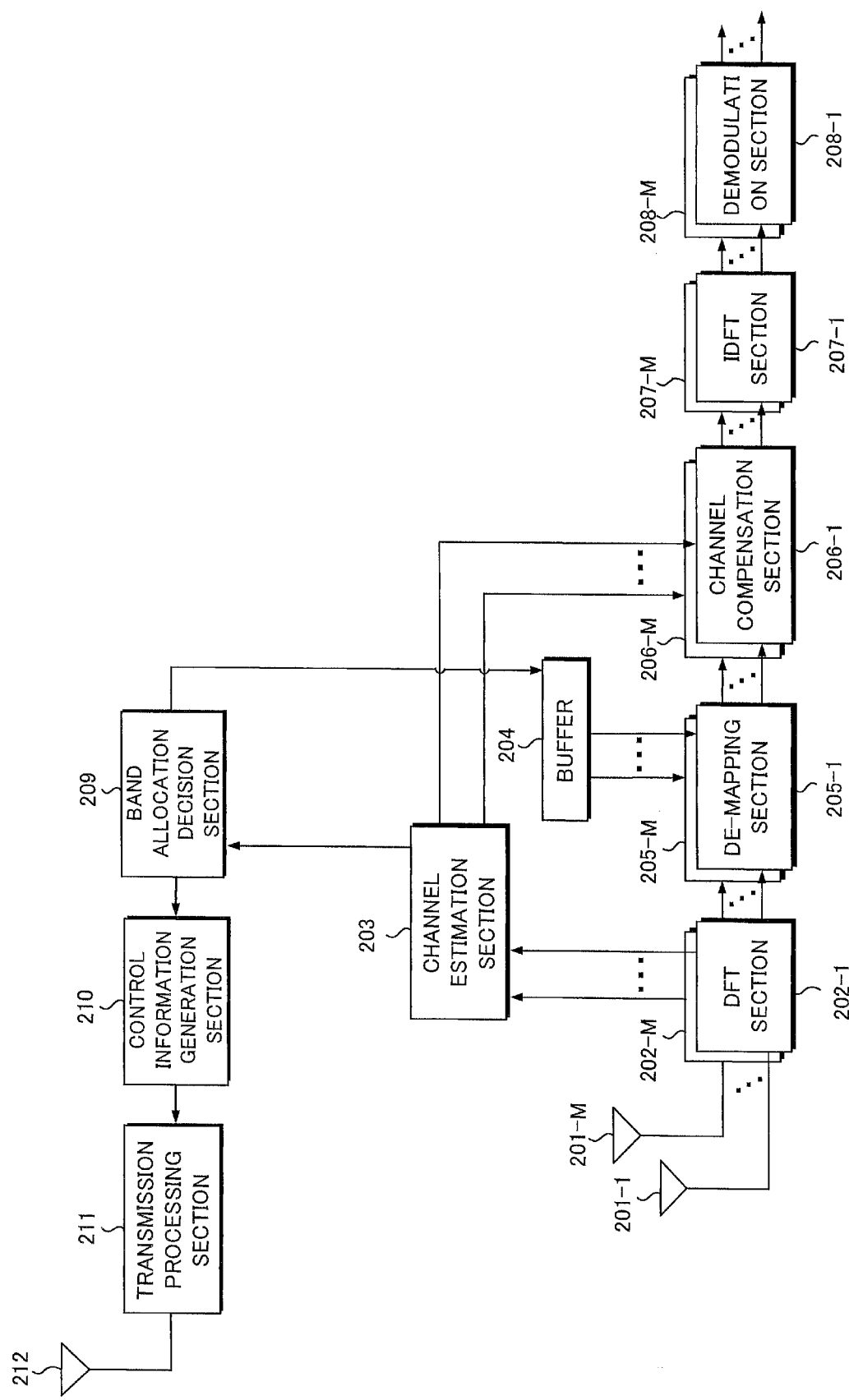
FIG. 3 is a block diagram showing an example of a base station apparatus which is a reception apparatus according to a first embodiment of the present invention.

FIG. 3 is a block diagram showing an example of a base station apparatus which is a reception apparatus according to the first embodiment of the present invention. While the base station apparatus has a plurality of antennas and can be considered to perform receiving diversity, MIMO separation, reception of a signal transmitted by the CA, and the like, since reception processing in each of the antennas is basically the same, the reception processing of one antenna which represents the plurality of antennas will be explained (number of antennas is set as M). A reception antenna 201-1 receives a signal transmitted from the mobile station apparatus. While omitted from the present example, the receiving signal is down-converted into a base band frequency, and the CP is removed when the CP is added. A DFT section 202-1 extracts the channel estimation signals included in the transmission signals and inputs the channel estimation signals into a channel estimation section 203, and the data signals are converted into frequency-domain signals. Information of the bands to which the signals are allocated is stored in a buffer 204 and the band allocation information is input into a de-mapping section 205-1. The de-mapping section 205-1 receives the band allocation information and extracts transmitted signals from the frequency domain signal.

A channel compensation section 206-1 performs processing of compensating for distortion in a radio channel such as multiplication of a minimum mean square error (MMSE) weight through the use of channel state information on a band, input from the channel estimation section 203 and used for the transmission. In the case of the MIMO, separation processing is performed on signals obtained from the respective channel compensation sections 206-1. In the receiving diversity or the MIMO, signals synthesis are combined. The signals are converted into a time-domain signal in an IFDT section 207-1 and are input into a demodulation section 208-1. The demodulation section 208-1 performs demodulation processing of the modulated signals input from the IDFT section 207-1. Meanwhile, the channel estimation section 203 estimates frequency response from the channel estimation signals which are a known signals received by each of the antennas and inputs the estimation result into the channel compensation section 206-1 and a band allocation determination section 209.

The band allocation determination section 209 allocates the same band for all the transmission antennas 109-1 to 109-M in the transmission diversity or the MIMO, and sometimes allocates a different band for each of the antennas when the CA is applied. The band allocation information is converted into control information data to be transmitted from a control information generation section 210, is converted into transmission signals by signal processing in a transmission processing section 211, is up-converted from a base band frequency signal, and is transmitted from a transmission antenna 212.

First Embodiment

In the present embodiment, there will be explained an example of changing a band allocation method depending on the capacity of the PA used for each of the antennas, when the mobile station performs data transmission using the plurality of antennas and the PAs and in the case where the total value of the allowable transmission power values of the PAs in the mobile station apparatus is larger than the maximum allowable transmission power value of the mobile station apparatus. In this case, it is assumed that the mobile station apparatus notifies the base station preliminarily of the capacity of each of the PAs. When the mobile station apparatus having the configuration of FIG. 1 performs the CA, the base station notifies the mobile station of a coding rate used in each of the CC, a modulation scheme, band allocation information, and the like, as the control information.

Figure 4:
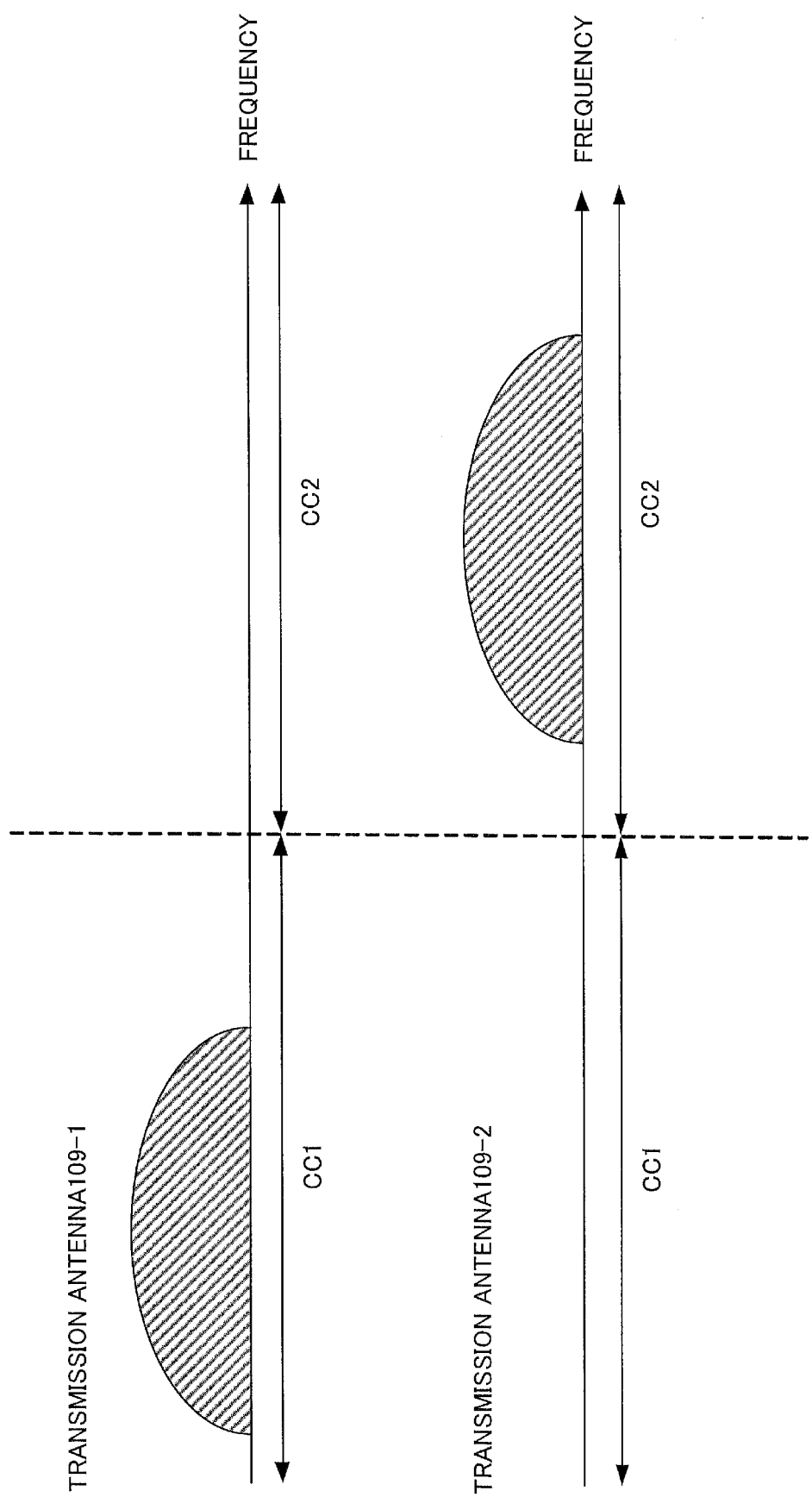
FIG. 4 is a diagram showing the case of using different CCs for respective transmission antennas 109 when data transmission is performed through the use of the plurality of transmission antennas 109 in a mobile station apparatus according to a first embodiment of the present invention.

FIG. 4 is a diagram showing a case in which the mobile station apparatus according to the first embodiment of the present invention makes use of the different CC for each of the transmission antennas 109 in the data transmission using the plurality of transmission antennas 109. As shown in FIG. 4, it is also possible to use the different CC for each of the transmission antennas 109. When the different CC is used for each of the transmission antennas 109, the mobile station apparatus can switch the Clustered DFT-S-OFDM which uses the non-contiguous bands and the SC-FDMA which uses the contiguous bands and use either of the access methods, as necessary, since the band allocation is performed for each of the transmission antennas 109. The Clustered DFT-S-OFDM and the SC-FDMA have signal peak powers different from each other, and when they are used by switching, the switching is determined from a required transmission power, the back-off, and the capacity of the PA used by the antenna.

However, the reception processing section 104 of the mobile station apparatus is required to perform the blind decoding of the control information which indicates the contiguous band allocation and the non-contiguous band allocation in the uplink for the CC to be used in each of the transmission antennas 109, and thus the maximum number of the blind decoding increases. Meanwhile, when the maximum transmission power of the mobile station apparatus is set as $TX_{MAX}$ and the respective plural transmission antennas 109 perform transmission at the same power, the maximum transmission power per one antenna 109 becomes as shown in Table 1. Accordingly, when the PA capacity is $TX_{MAX}$ dBm and the number of the transmission antennas 109 is two, a tolerance of 3 dB can be obtained and it becomes unnecessary to consider the back-off not more than 3 dBm. Furthermore, when the number of the transmission antennas 109 is two and the PA capacity is $TX_{MAX}$–3 dBm, as before, it is necessary to take the back-off into consideration. Therefore, even for the non-contiguous band allocation, if the PA has a large capacity, the summation of the transmission power and the back-off does not easily exceed the PA capacity, and thus transmission signal distortion is not easily generated.

TABLE 1

| NUMBER OF TRANSMISSION ANTENNAS | MAXIMUM TRANSMISSION POWER PER ONE TRANSMISSION ANTENNA OF MOBILE STATION APPARATUS |
|---|---|
| 1 | $TX_{MAX}$ (dBm) |
| 2 | $TX_{MAX}$ – 3 (dBm) |
| 4 | $TX_{MAX}$ – 6 (dBm) |

Accordingly, in the CC transmitting the signal using the PA having a large capacity, for example, the PA having an allowance up to 23 dBm, the base station apparatus notifies the mobile station apparatus only of the control information always indicating the non-contiguous band allocation, and the mobile station apparatus performs the blind decoding only for the control information in the format of the non-contiguous band allocation. Furthermore, for the CC to be used by the PA having a small capacity, for example, the PA having an allowance up to 20 dBm, since the total of the transmission power and the back-off sometimes exceed the PA capacity, the base station apparatus notifies the mobile station apparatus of both formats of the control information sets indicating the contiguous band allocation and the non-contiguous band allocation or only of the format of the contiguous band allocation, and the mobile station performs the blind decoding only on the control information in the necessary format in accordance with a method of the notification.

Although in the present embodiment, a case where the CA is applied is explained, also in a case where the antennas make use of the same CC, providing notification of similar control information for each of the antennas falls within the range of the present invention. By applying the present embodiment, it is possible to determine the transmission power without considering the back-off by means of always performing the discrete band allocation for the PA having a large capacity, when the mobile station performs transmission using the plurality of antennas. Accordingly, for the PA having a large capacity, it is possible to reduce the number of the formats of the control information to be subjected to the blind decoding.

Second Embodiment

In the present embodiment, an example of changing the number of divisions in a frequency domain signal to be non-contiguously allocated will be explained depending on the capacity of the PA used by each of the transmission antennas 109, when the mobile station apparatus performs the data transmission using the plurality of transmission antennas 109 and the total value of the allowable transmission power values of the PAs in the mobile station apparatus is larger than the maximum allowable transmission power value of the mobile station apparatus. In this case, it is assumed that the mobile station apparatus preliminarily notifies the base station apparatus of the capacity of each of the PAs. In the downlink of LTE, a resource block group including an integer multiple of resource blocks is defined in accordance with the number of the resource blocks capable of being allocated within one CC, as defined in Table 2.

TABLE 2

| NUMBER OF RESOURCE BLOCKS CONSTITUTING RESOURCE BLOCK GROUP | NUMBER OF RESOURCE BLOCKS CAPABLE OF BEING ALLOCATED TO MOBILE STATION APPARATUSES WITHIN CC |
|---|---|
| 1 | ~10 |
| 2 | 11~26 |
| 3 | 27~63 |
| 4 | 64~110 |

Furthermore, in the non-contiguous allocation of the LTE downlink, the minimum allocation unit is determined to be allocated by a unit of the resource block. In the same way, also in the Clustered DFT-S-OFDM, flexibility of scheduling is improved by the non-contiguous allocation, the frequency selection diversity effect is increased, and throughput is improved, but the peak power is also increased in accordance with the number of divisions.

When the mobile station apparatus performs the data transmission by using the plurality of transmission antennas 109 in the CA which uses the different CC for each of the transmission antennas 109, the band allocation determination section 209 of the base station apparatus determines band allocation for each of the transmission antennas 109 and notifies the mobile station apparatus of the determination result by the control information. Here, in the present embodiment, the transmission antenna 109 and the PA are assumed to be associated one-to-one with each other. When the band allocation is determined, in the case of the transmission antenna 109 using the PA having a small capacity, it is necessary to take into consideration the nonlinearity of the PA and the cluster size is determined in consideration of the back-off, and, in the case of the transmission antenna 109 using the PA having a large capacity, the allocation using a small cluster size is determined without consideration of the back-off. For example, when the PA having a small capacity is a PA having an allowance up to 20 dBm and the PA having a large capacity is a PA having an allowance up to 23 dBm, the capacity of the PA to be used by the transmission antenna 109 and the cluster size may be determined as shown in following Table 3.

TABLE 3

| PA CAPACITY | NUMBER OF RESOURCE BLOCKS CONSTITUTING CLUSTER |
|---|---|
| 23 dBm | 1 |
| 20 dBm | $1 \leq N_{cluster} \leq N_{RBG}$ |

However, $N_{cluster}$ is the number of the resource blocks constituting the cluster for the PA having a small capacity and $N_{RBG}$ is the number of the resource blocks constituting the resource block group.

The transmission antenna 212 notifies the mobile station apparatus of the band allocation information determined by the above method, as the control information, through the use of the CC used by each of the transmission antennas 109. The mobile station apparatus performs mapping of data in the frequency domain based on the notified control information. However, while the minimum bandwidth to be allocated is set as a unit of the resource block in the present embodiment, the minimum bandwidth may be a unit of the subcarrier for the transmission antenna 109 which uses the PA having a large capacity, and, if the bandwidth is smaller than the number of the resource blocks constituting the cluster for the transmission antenna 109 using the PA having a small capacity, this falls within the range of the present invention. Furthermore, although in the present embodiment, there has been explained a case in which the data transmission is performed by the CA using a different CC for each of the transmission antennas 109, the case in which the plurality of transmission antennas 109 transmit data using the same CC is also included in the present embodiment, when notification of the band allocation is provided by the control information for each of the transmission antennas 109 and the cluster size is changed depending on the capacity of the PA used by the transmission antenna 109.

By applying the present embodiment, when the mobile station apparatus performs the transmission using the plurality of transmission antennas 109, it is possible to determine the transmission power without considering the back-off, to obtain a high frequency selection diversity gain, and to improve the transmission performances, by reducing the cluster size for the PA having a large capacity. Furthermore, while it is shown in the first and second embodiments as an advantage that the base station apparatus is preliminarily notified of the capacity of the PA and the blind decoding can be performed efficiently, even when the base station apparatus is not preliminarily notified of the capacity of the PA, it also becomes possible to reduce the probability of the distortion caused by signal saturation at the output end of the PA, by adaptively switching the transmission antennas 109 depending on an allocation method of the resource blocks for each of the CC (contiguous/non-contiguous, large/small cluster size, large/small number of the resource blocks to be allocated, and the like).

Third Embodiment

In the present embodiment, an example of changing a method of applying the pre-coding will be explained in consideration of the capacity of the PA used for each of the transmission antennas 109, when the mobile station performs the data transmission in the MIMO and the total value of the allowable transmission power values of the PAs in the mobile station apparatus is larger than the maximum allowable transmission power of the mobile station apparatus. In this case, it is assumed that the mobile station preliminarily notifies the base station of the capacity of each of the PAs.

Figure 5:
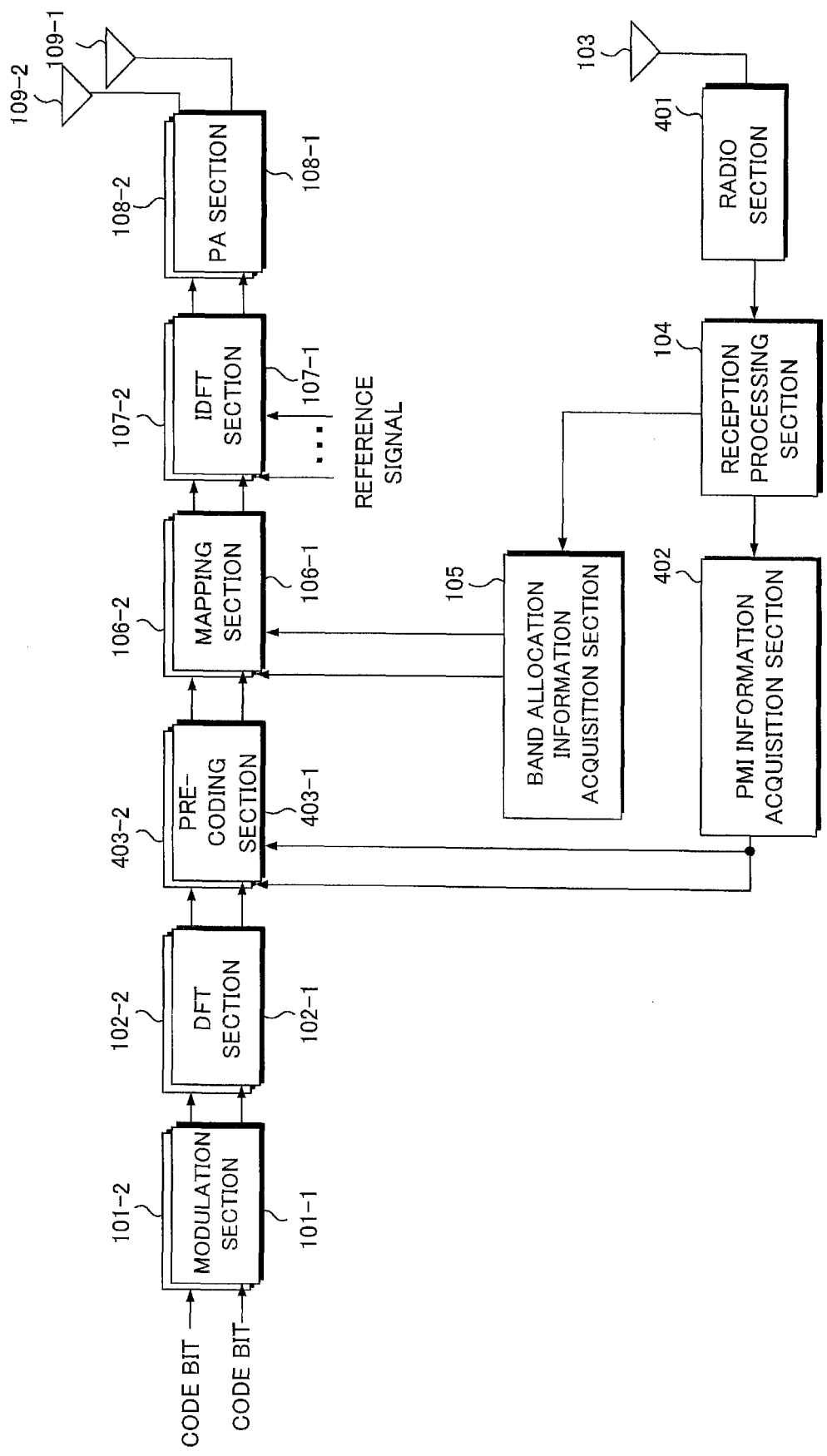
FIG. 5 is a block diagram showing an example of a mobile station apparatus which includes two transmission antennas 109 when data transmission is performed in MIMO, in a third embodiment of the present invention.

FIG. 5 is a block diagram showing an example of a mobile station apparatus having two transmission antennas 109 when the data transmission is performed by the MIMO, in the third embodiment of the present invention. The mobile station apparatus, when performing transmission in the MIMO, receives a PMI (Pre-coding Matrix Indicator) expressing a pre-coding matrix to be multiplied to the transmission signal, as the control information from the base station apparatus together with the band allocation information by a reception antenna 103. The received control information is input into a radio section 401 and is subjected to down-conversion into the base band frequency. Subsequently, the control information reception processing is provided as in FIG. 1. A band allocation information acquisition section 105 inputs the band allocation information included in the control information into mapping sections 106-1 and 106-2, and a PMI information acquisition section 402 inputs PMI information included in the control information into pre-coding sections 403-1 and 403-2.

Meanwhile, code bits are subjected to processing in the steps up to DFT sections 102-1 and 102-2 as in FIG. 1 and a frequency domain signal is generated. The pre-coding sections 403-1 and 403-2 suppress quality degradation caused by reverse phase addition of a spatially-multiplexed signal, by multiplying pre-coding vector (also called transmission weight) which provides phase rotation depending on a channel in each of the transmission antennas 109, based on the PMI information. In the case of having two transmission antennas 109, the phase rotation may be provided only for one transmission antenna 109, and a signal multiplexed spatially on the receiving side is combined appropriately. Furthermore, the pre-coding is preferably applied to frequency domain signals in a narrow bandwidth, and, particularly in the case of using the bands non-contiguously as in the Clustered DFT-S-OFDM, sometimes the channel is largely different among the clusters depending on the cluster allocation, and thus the pre-coding is preferably applied for a unit of the cluster. However, when the pre-coding is applied for a bandwidth narrower than the cluster, the peak power is increased, and thus it is necessary to reduce the transmission power by an amount corresponding to the back-off in consideration of the nonlinearity of the PA.

Figure 6:
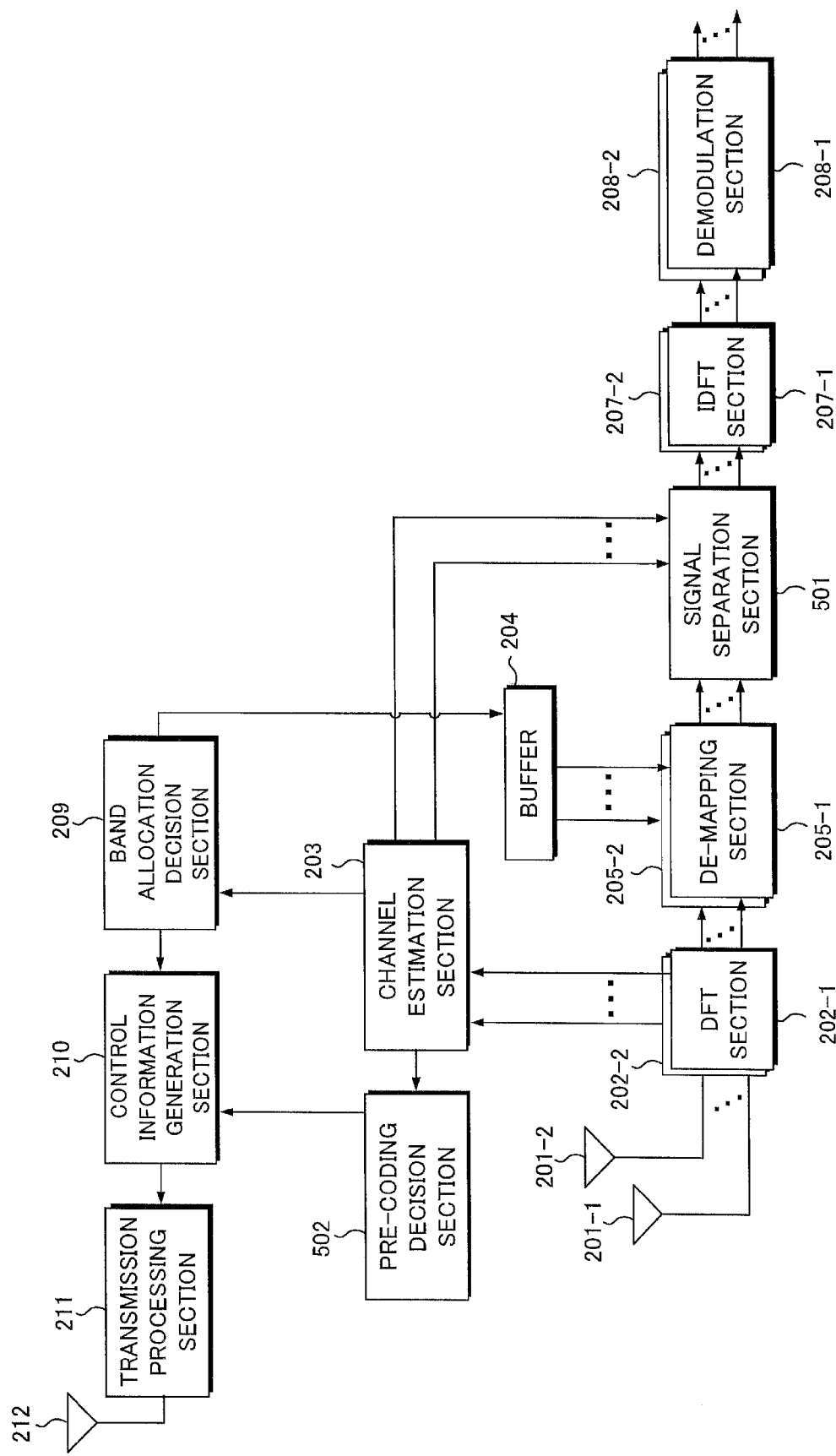
FIG. 6 is a block diagram showing an example of a base station apparatus which receives a spatially-multiplexed signal, in a third embodiment of the present invention.

FIG. 6 is a block diagram showing an example of a base station apparatus receiving the spatially-multiplexed signal in the third embodiment of the present invention. While, in the present embodiment, the case of two reception antennas will be explained, the case of three or more reception antennas is also similar thereto. In the base station apparatus, as in FIG. 3, de-mapping sections 205-1 and 205-2 input frequency domain signals extracted based on the band allocation information, into a signal separation section 501. The signal separation section 501 performs separation of the spatially-multiplexed signals, and the separated signals are converted into respective time-domain signals in IDFT sections 207-1 and 207-2.

Meanwhile, a channel estimation section 203 inputs a channel estimation value of each of reception antennas 201 into a band allocation determination section 209 and a pre-coding determination section 502. The pre-coding determination section 502 determines the pre-coding which provides phase rotation for one of the transmission antenna 109 in the case of the MIMO using the two transmission antennas 109, and inputs the PMI information into a control information generation section 210, and the PMI information is transmitted as the control information from a transmission antenna 212 together with the band allocation information. Here, in determining the pre-coding, the bandwidth to which the pre-coding is applied is determined depending on the capacity of the PA to be used by the transmission antenna 109.

Figure 7:
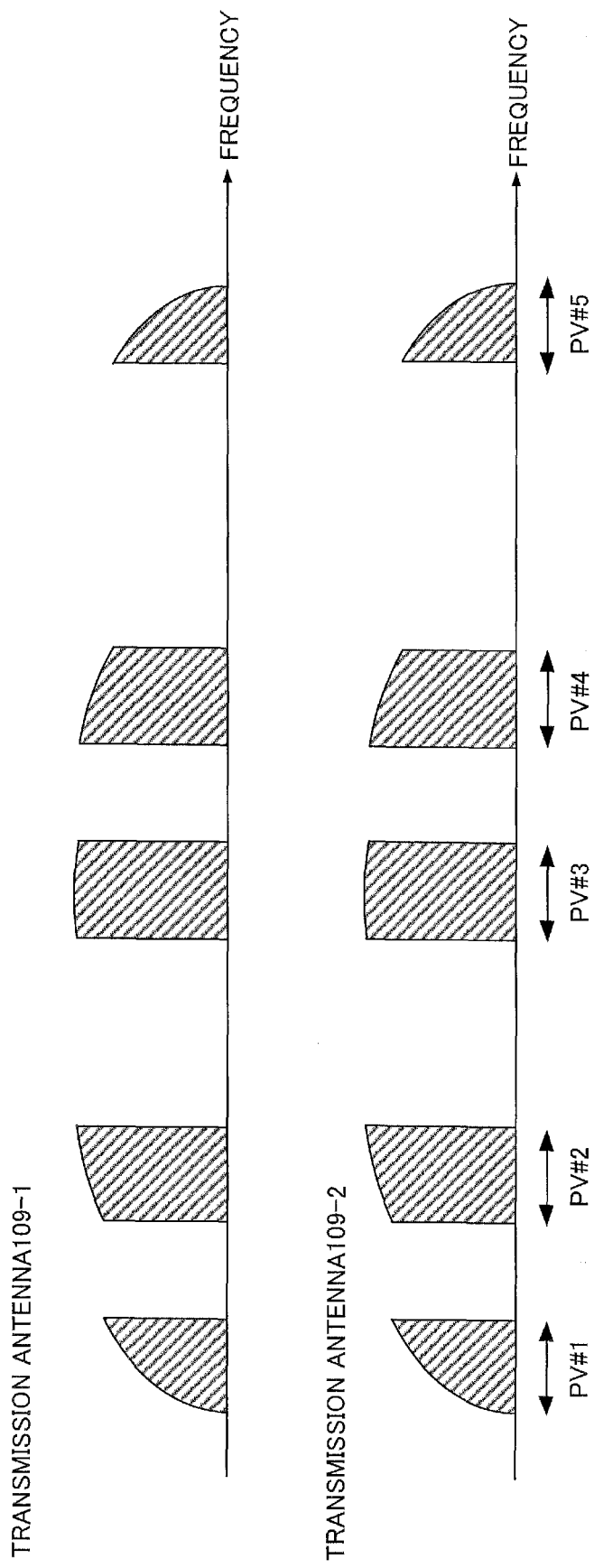
FIG. 7 is a diagram showing an example of pre-coding application, in a third embodiment of the present invention.

FIG. 7 is a diagram showing an example of pre-coding application in the third embodiment of the present invention. When the transmission antenna 109-2 uses the PA having a large capacity, it is not necessary to reduce the transmission power even when the pre-coding providing a higher peak power is applied for a unit of the cluster, and thus pre-coding vectors PV#1, PV#2, ..., PV#5 are determined based on the channels of the frequency bands where respective clusters are allocated. When the transmission antenna 109-2 uses the PA having a small capacity, it is necessary to take the back-off into consideration, and thus the pre-coding vectors are set as PV#1=PV#2= ... =PV#5. This is processing of providing the same phase rotation for all the clusters and, even when the pre-coding is applied, the peak power is the same as that in the case without the pre-coding application. While the pre-coding is applied to the transmission antenna 109-2 in the present embodiment, the pre-coding may be applied to the transmission antenna 109-1 for each of the clusters when the PA to be used by the transmission antenna 109-1 has a large capacity. Furthermore, while, in the present embodiment, the case of the Clustered DFT-S-OFDM will be explained, the case of the SC-FDMA can also be applied.

Figure 8:
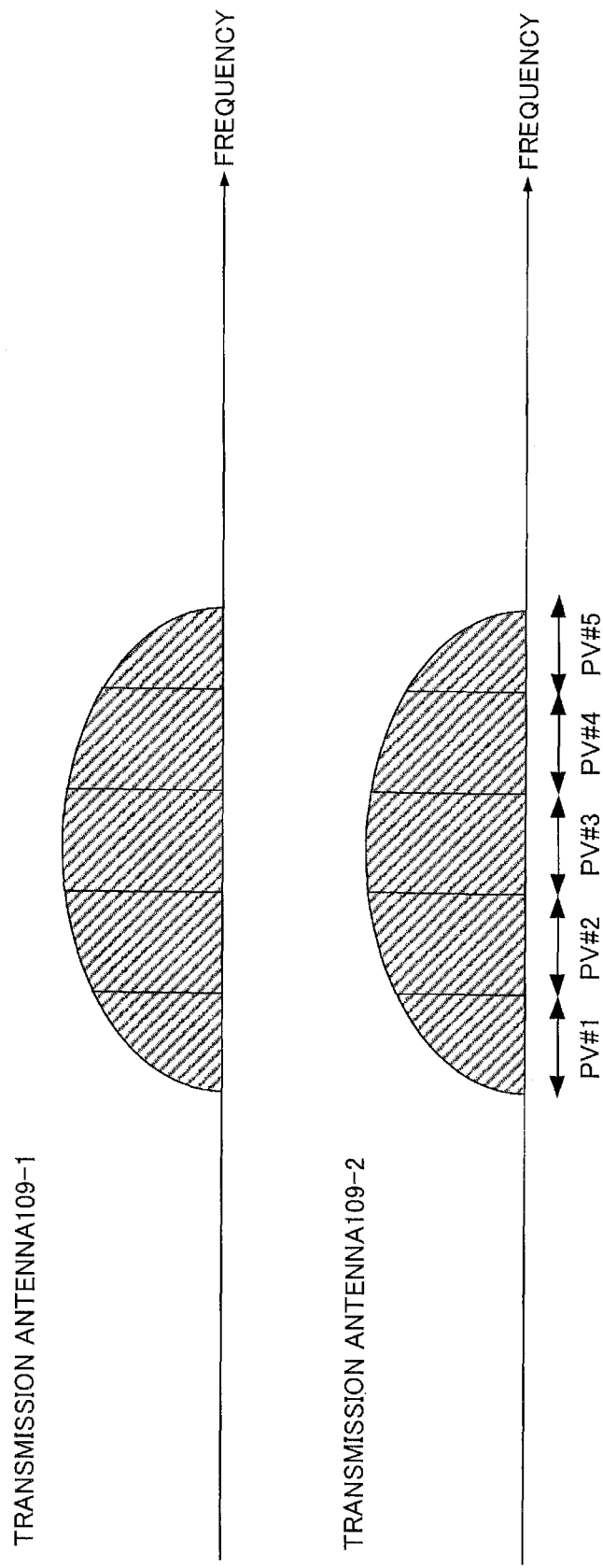
FIG. 8 is a diagram showing an example of pre-coding application for SC-FDMA transmission, in a third embodiment of the present invention.

FIG. 8 is a diagram showing an example of the pre-coding application for the transmission by the SC-FDMA in the third embodiment of the present invention. For the transmission by the SC-FDMA, when the PA to be used by the transmission antenna 109-2 has a large capacity, each of the pre-coding vectors PV#1 to PV#5 which are different in accordance with the channels may be applied in a unit of the resource block as in FIG. 8, and, when the PA to be used by the transmission antenna 109 has a small capacity, the pre-coding may be applied as PV#1=PV#2= ... =PV#5. Furthermore, the unit to which the pre-coding vector of the SC-FDMA is applied may be an integer multiple of the resource block or a unit of the sub-carrier. As in the case of the Clustered DFT-S-OFDM, the pre-coding vector may be applied to a bandwidth narrower than the cluster.

Figure 9:
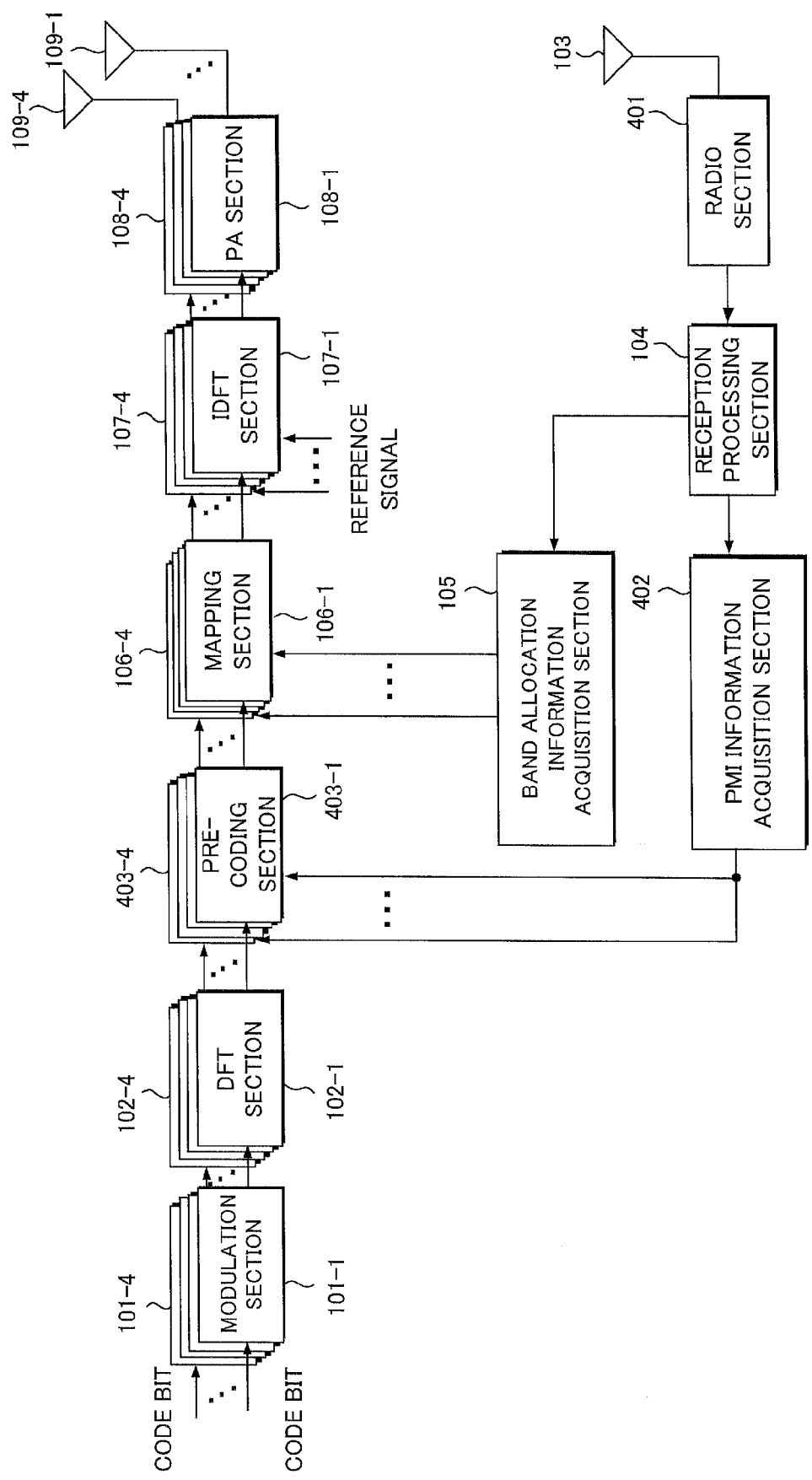
FIG. 9 is a block diagram showing an example of a mobile station apparatus having four transmission antennas 109 in a third embodiment of the present invention.

FIG. 9 is a block diagram showing an example of a mobile station apparatus having four transmission antennas 109, in the third embodiment of the present invention. In the case of the four transmission antennas 109, the number of spatially-multiplexed signals is increased. Therefore, a PMI information acquisition section 402 inputs the pre-coding vectors into the respective transmission antennas 109-1 to 109-4 in accordance with the received PMI information.

Figure 10:
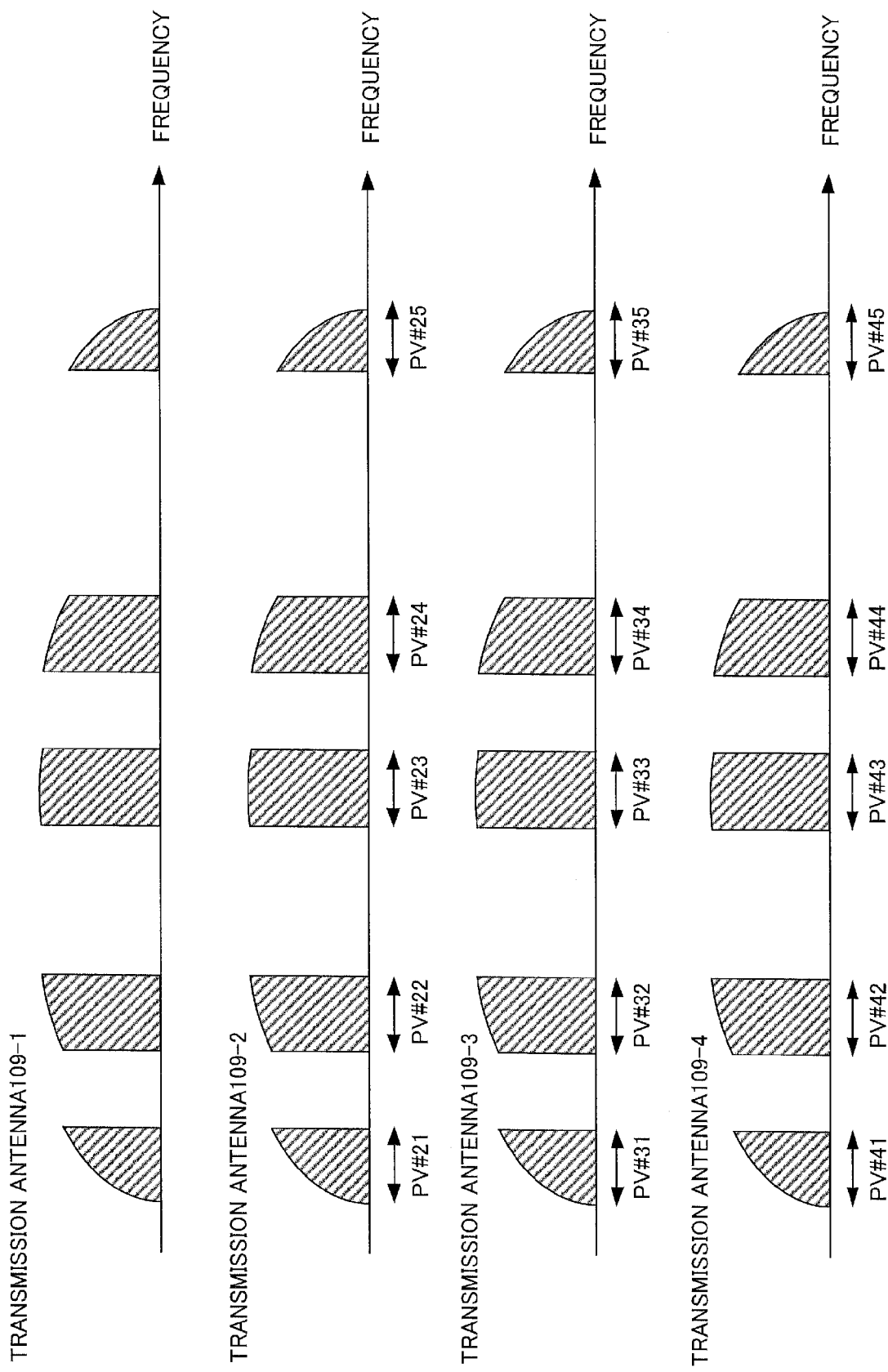
FIG. 10 is a diagram showing an example of pre-coding application in the case of a mobile station apparatus having four transmission antennas 109 in a third embodiment of the present invention.

FIG. 10 is a diagram showing an example of the pre-coding application when the mobile station apparatus has the four transmission antennas 109 in the third embodiment of the present invention. The pre-coding provides phase rotation for the signals to be transmitted from the three transmission antennas 109 as in FIG. 10. The pre-coding vector is changed in a unit of the cluster only for the transmission antenna 109 which uses the PA having a larger capacity among the transmission antennas 109-1 to 109-4.

For example, when the PA used only by the transmission antenna 109-4 has a larger capacity, the pre-coding is performed as PV#21=PV#22= ... =PV#25, PV#31=PV#32= ... =PV#35, and PV#41 to PV#45 are determined depending on the channels of the frequencies where the clusters are allocated. However, PV#21 and PV#31 are determined depending on the channels of the transmission antennas 109-2 and 109-3. Furthermore, the transmission antenna 109 to which the phase rotation by the pre-coding is not applied, while being the transmission antenna 109-1 in the present embodiment, may be another transmission antenna 109 or the transmission antenna 109 which uses the PA having a smaller capacity. While the present embodiment explains that the pre-coding is applied to a unit of the cluster for the transmission antenna 109 which uses the PA having a large capacity, the pre-coding may be applied to a unit of the resource block or the subcarrier.

By applying the present embodiment, when the mobile station apparatus performs the data transmission in the MIMO, it is possible to determine the transmission power without considering the back-off for the PA, and, since the spatially-multiplexed signal becomes easily separated on the receiving side, it is possible to improve the transmission performances, by means of applying the pre-coding in a cluster unit to the transmission antenna 109 which uses the PA having a large capacity.

Fourth Embodiment

In the present embodiment, there will be explained an example of determining the transmission antenna 109 which performs transmission by multiplexing the data and the control information in consideration of the capacity of the PA to be used for each of the transmission antennas 109, when the mobile station apparatus performs the data transmission by using the plurality of transmission antennas 109, in the case where the total value of the allowable transmission power values of the PAs in the mobile station apparatus is larger than the maximum allowable transmission power value of the mobile station apparatus, and when the data and the control information are required to be transmitted at the same time. In LTE-A, since the number of the transmission antennas 109 is increased in the mobile station apparatus and the CA using the plurality of CCs are specified, the number of control information sets is increased such as ACK, NAK, CQI (Channel Quality Indication), and the like, of which the mobile station apparatus notifies the base station in the PUCCH. Accordingly, it is being discussed that multi-carrier transmission for transmitting the data and the control information at the same time is also made possible.

Figure 11:
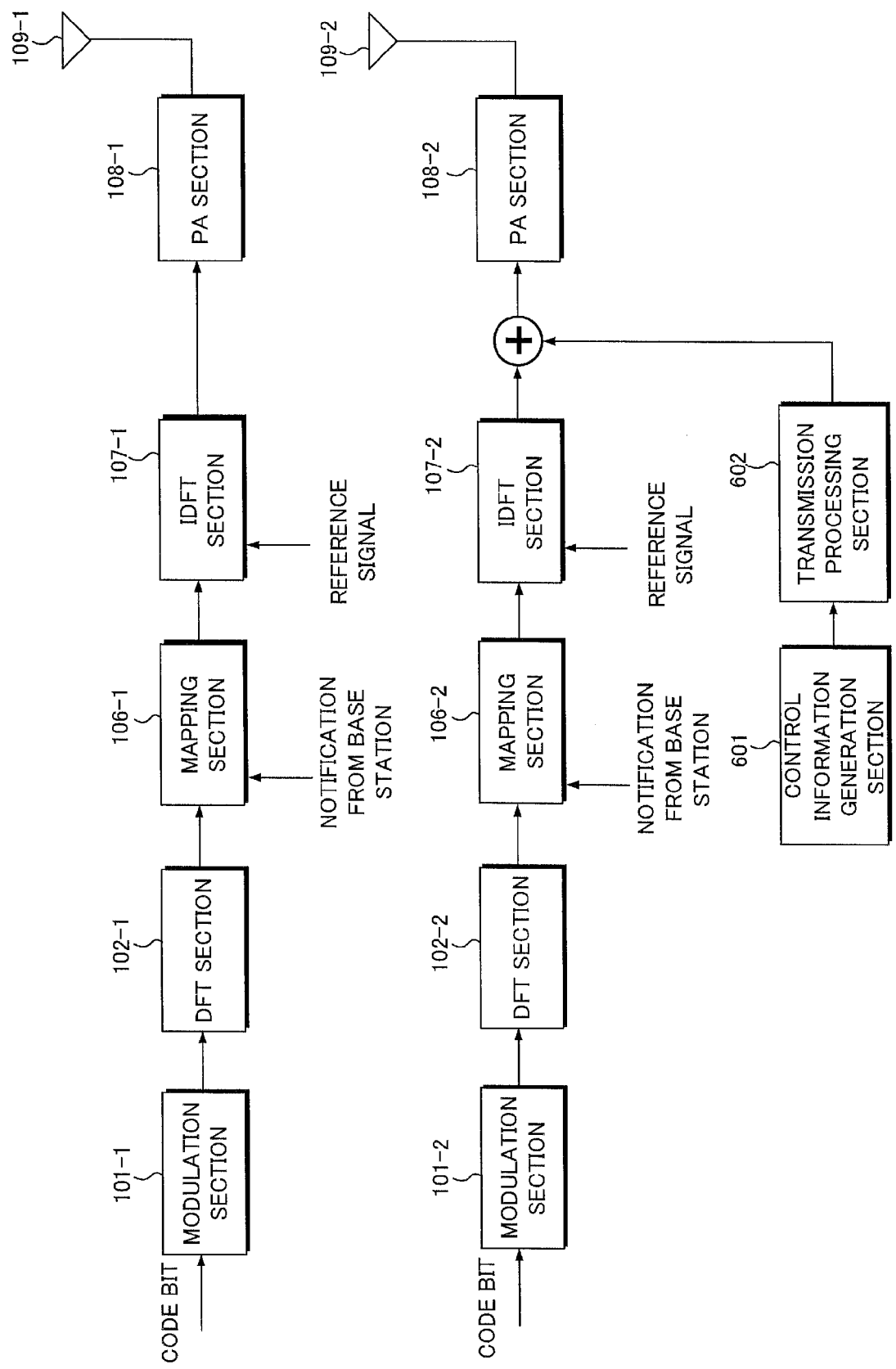
FIG. 11 is a block diagram showing an example of a mobile station apparatus according to a fourth embodiment of the present invention.

FIG. 11 is a diagram showing an example of a mobile station apparatus according to the fourth embodiment of the present invention. Here, for the configuration of the PA in the mobile station apparatus, it is assumed that a PA section 108-1 is the PA having a small capacity and a PA section 108-2 is the PA having a large capacity. Furthermore, while the number of transmission antennas 109 is two in the explanation, the present embodiment can be applied to the case of three or more transmission antennas 109. In the mobile station apparatus, a control information generation section 601 generates ACK and NACK for data received in the downlink from the base station, CQI, RI (Rank Indication), and PMI to be transmitted periodically to the base station as control information for the downlink, and the like. The control information is converted into time-domain signals in a transmission processing section 602. Meanwhile, an IDFT section 107-2 outputs time-domain transmission data signals. Here, when data transmission and control information transmission are required to be performed at the same timing, the multi-carrier signal thereof becomes a transmission signal having a high peak power and it is preferable to use the PA section 108-2 which has a large capacity. Accordingly, the control information signal output from the transmission processing section 602 and the output from the IDFT section 107-2 are added to each other and transmitted from the transmission antenna 109-2 via the PA section 108-2.

Furthermore, if a signal having a high peak power is transmitted in the PA section 108-1 having a small capacity, distortion is caused in the transmission signal by the nonlinearity of the PA, and only the data signal is transmitted by the transmission antenna 109-1 without being multiplexed with the control information. The signal in which the time-domain signals of control information and the data are added to each other becomes a multi-carrier signal having a high peak power, and therefore transmission power control needs to be performed in consideration of the back-off from the nonlinearity of the PA. In the present embodiment, when the control information needs to be transmitted at the same timing as the data transmission, the time-domain signal of the control information is added to the transmission antenna 109 which uses the PA having a large capacity, and thus it is not necessary to reduce the transmission power for an amount corresponding to the back-off reduction caused by peak power increase in the simultaneous transmission of the data and the control information.

By applying the present embodiment, it is not necessary to reduce the transmission power considering the back-off and it is possible to improve the transmission performances, by means of adding the control information signal to the transmission antenna 109 which uses the PA having a large capacity when the mobile station apparatus performs the data transmission using the plurality of transmission antennas 109 and the data and the control information are required to be transmitted at the same time.

Fifth Embodiment

In the present embodiment, there will be explained an example of determining allocation of an SFBC-coded signal having a high peak power in consideration of the capacity of the PA to be used by each of the transmission antennas 109, when the mobile station apparatus which has the plurality of transmission antennas 109 performs the data transmission by the SFBC (Space Frequency Block Code) and in the case where the total value of the allowable transmission power values of the PAs in the mobile station apparatus is larger than the maximum allowable transmission power of the mobile station apparatus.

Figure 12:
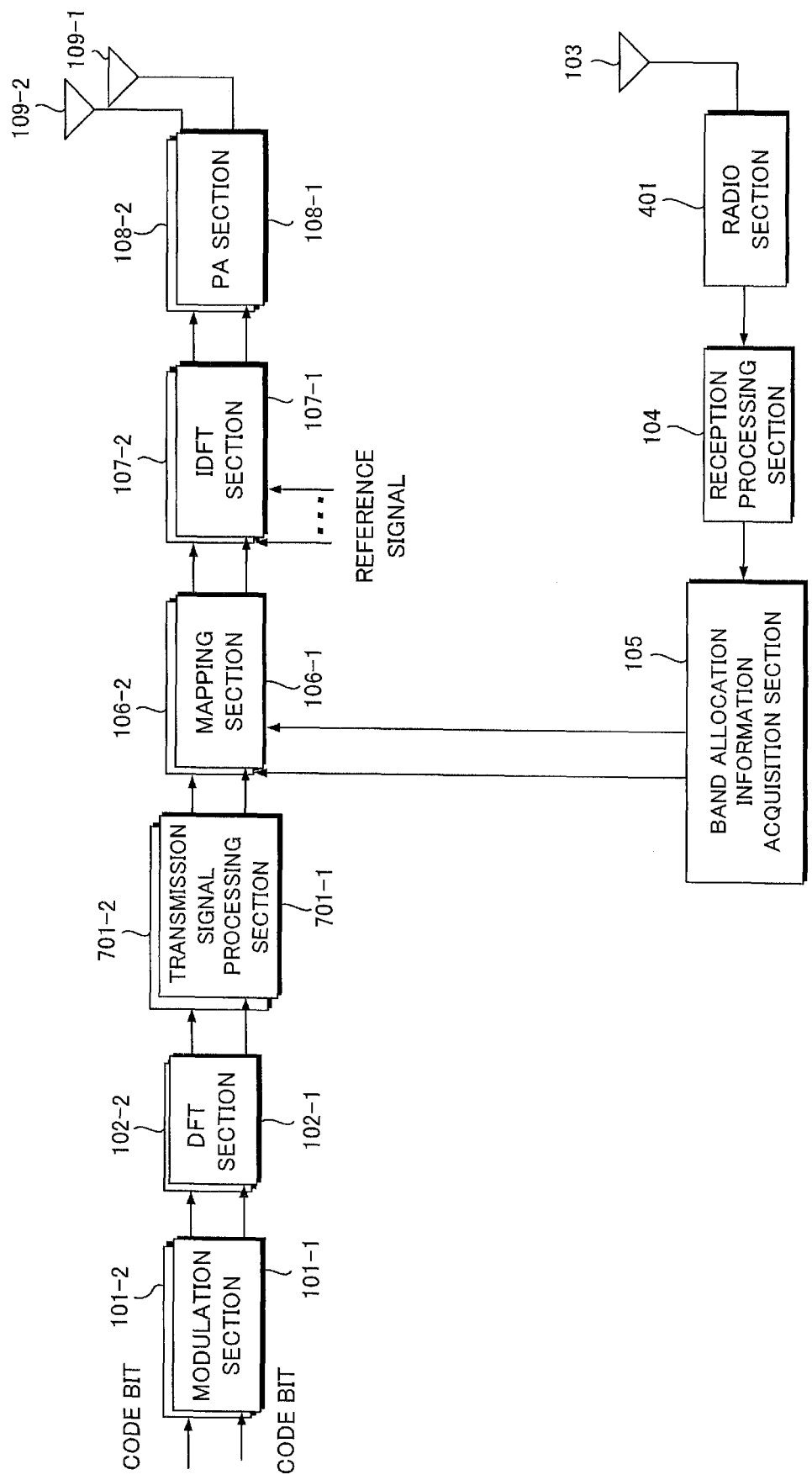
FIG. 12 is a block diagram showing an example of a mobile station apparatus according to a fifth embodiment of the present invention.

FIG. 12 is a block diagram showing an example of a mobile station apparatus according to the fifth embodiment of the present invention. Here, for the configuration of the PA in the mobile station, it is assumed that a PA section 108-1 is the PA having a large capacity and a PA section 108-2 is the PA having a small capacity. Sometimes the transmission power becomes short in a mobile station at a cell edge and a desired communication quality cannot be secured. In such a mobile station apparatus, the SFBC which is a transmission diversity method could be applied for maintaining the desired communication quality even at the cell edge.

The mobile station apparatus in FIG. 12 is a mobile station apparatus using the SFBC, and frequency domain signals are input from DFT section 102-1 and 102-2 into respective transmission signal processing sections 701-1 and 701-2. Here, since the same data is transmitted in the transmission diversity, the DFT sections 102-1 and 102-2 output the same signal and the number of modulation sections 101 and the DFT sections 102 may be one. The transmission signal processing sections 701-1 and 701-2 performs SFBC coding. In the SFBC coding, the peak power becomes higher in one of the transmission signals and does not change in the other one. In the present embodiment, the SFBC coding which increases the peak power is performed for the signal to be transmitted through the use of the PA section 108-1 having a large capacity. Accordingly, the processing in the transmission signal processing section 701-1 is processing increasing the peak power in the present embodiment.

Figure 13:
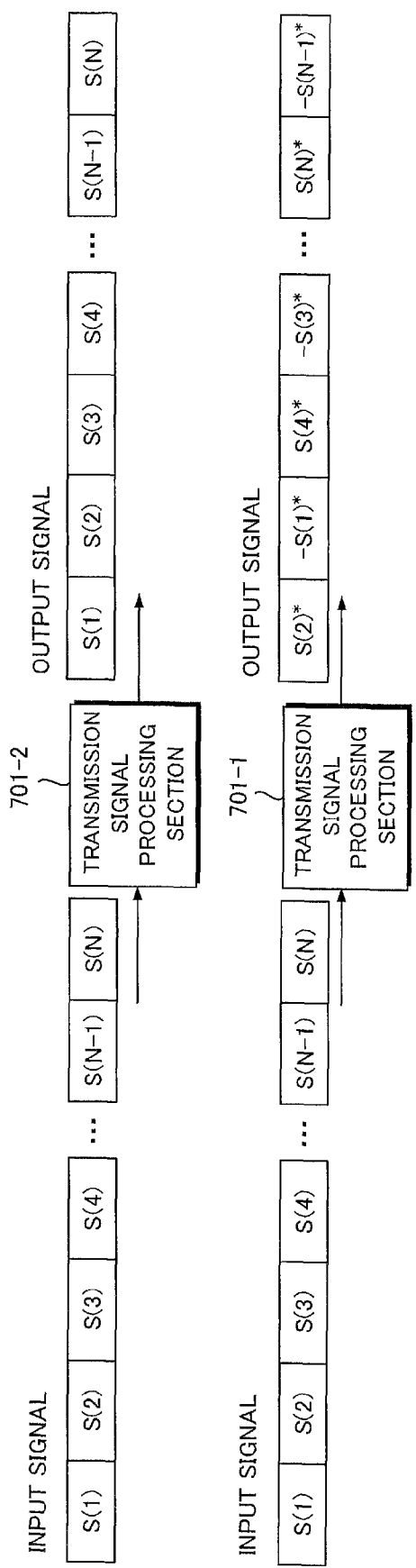
FIG. 13 is a diagram showing a SFBC coding method according to a fifth embodiment of the present invention.

FIG. 13 is a diagram showing a SFBC coding method according to the fifth embodiment of the present invention. In the present embodiment, the transmission signal processing section 701-1 performs the processing on the frequency domain signals S(1), S(2), . . . , S(N). The coding is performed for a unit of two sub-carriers, and, for the (k−1)th and kth sub-carriers, the signals S(K−1) and S(k) are coded into S(k)* and −S(k−1)*. Here, X* is the complex conjugate of X. Furthermore, the transmission signal processing 701-2 outputs S(1), S(2), . . . , S(N) which are the same as the input signals.

The signal output from the transmission signal processing section 701-1 is transmitted from a transmission antenna 109 via a mapping section 106-1, an IDFT section 107-1, and the PA section 108-1. Transmission processing from the transmission antenna 109-2 is the same and explanation will be omitted. When a signal having a high peak power is transmitted through the use of the PA having a small capacity, the distortion in the transmission signal is caused by the nonlinearity of the PA, and the transmission power needs to be reduced in consideration of the back-off.

In the present embodiment, by means of selecting the signal for the transmission antenna 109 using the PA having a large capacity to perform the coding which increases the peak power, it becomes unnecessary to reduce the transmission power in consideration of an increased amount of the peak power caused by the coding. By applying the present embodiment, in a case where the mobile station apparatus performs the data transmission using the SFBC, it is not necessary to reduce the transmission power in consideration of the back-off and it is possible to improve the transmission performances, by means of allocating the signal having a high peak power caused by the SFBC coding, to the transmission antenna 109 which uses the PA having a large capacity.

Sixth Embodiment

In the present embodiment, there will be explained an example of determining the transmission antenna 109 which uses the plurality of CCs in consideration of the capacity of the PA used by each of the transmission antennas 109, when the mobile station performs the data transmission using the plurality of transmission antennas 109 and applies the CA, and in the case where the total value of the allowable transmission power values of the PAs in the mobile station apparatus is larger than the maximum allowable transmission power of the mobile station apparatus. In this case, it is assumed that the mobile station apparatus notifies the base station apparatus preliminarily of the capacity of each of the PAs. In the CA performing the data transmission on the plural CCs at the same timing, there can be considered a case of using a different PA for each of the CCs, a case of performing data transmission of the CCs to be used through the use of one PA, and the like. However, in the CA, one single carrier signal using the DFT is allocated to one CC in the frequency domain. In the CA transmitting signals by the plurality of CCs through the use of one PA, a multi-carrier signal having a high peak power is transmitted.

Figure 14:
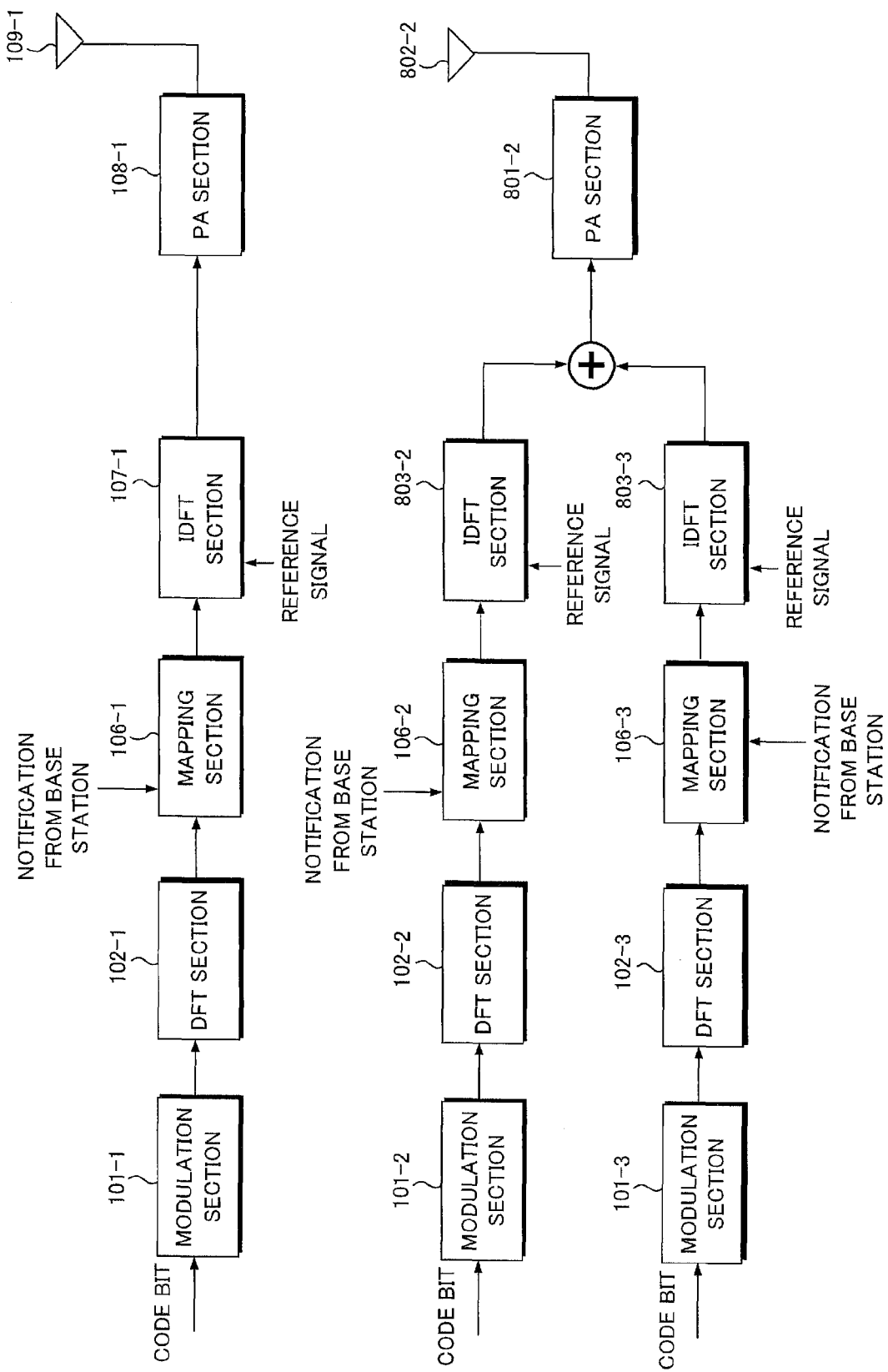
FIG. 14 is a block diagram showing an example of a mobile station apparatus according to a sixth embodiment of the present invention.

FIG. 14 is a block diagram showing an example of a mobile station apparatus according to the sixth embodiment of the present invention. It is assumed that a PA section 108-1 is the PA having a small capacity and a PA section 801-2 is the PA having a large capacity. Although there will be explained a case in which the mobile station apparatus in the present embodiment includes both of the PA having a large capacity and the PA having a small capacity, even a mobile station apparatus having a different configuration of the PA, if it is substantially the same as the mobile station apparatus of the present embodiment, is considered to be the same as the mobile station apparatus in the present invention. Since a transmission antenna 109-1 uses the PA having a small capacity, if plural CC signals having a high peak power are transmitted, the distortion in the transmission signal is caused by the nonlinearity of the PA. Furthermore, since reduction in the transmission power or the like becomes necessary in consideration of the back-off, only a signal for one CC is transmitted. In contrast, since a transmission antenna 802-2 uses the PA section 801-2 having a large capacity, it is not necessary to take into consideration the back-off corresponding to an increased amount of the peak power when the plural CC signals are transmitted and it is not necessary to reduce the transmission power. Therefore, as the signal transmitted from the transmission antenna 802-2, an IDFT section 803-1 and an IDFT section 803-3 generate time-domain signals to be transmitted to the different CCs, respectively, and a signal obtained by adding these time-domain signals to each other is transmitted.

By applying the present embodiment, when the mobile station apparatus performs the data transmission using the CA, it becomes unnecessary to reduce the transmission power in consideration of the back-off and it is possible to improve the transmission performances, by means of allocating the signal having a high peak power, to which signals to be transmitted to the plural CCs are added, to the transmission antenna 802-2 which uses the PA having a large capacity.

A program operating in the mobile station apparatus and the base station apparatus according to the present invention is a program controlling a CPU and the like (program causing a computer to function) so as to realize the functions of the above embodiments according to the present invention. Furthermore, information treated in these apparatuses is held temporarily in a RAM at the time of the processing thereof, and then the information is stored into various kinds of ROM or an HDD where the CPU performs read-out, correction, and write-in as necessary. The recoding medium storing the program may be any of semiconductor media (e.g., ROM, non-volatile memory card, or the like), optical recording media (e.g., DVD, MO, MD, CD, BD, or the like), magnetic recording media (e.g., magnetic tape, flexible disk, or the like) and the like.

Moreover, by the execution of the loaded program, not only the functions of the above embodiments are realized, but also the functions of the present invention are sometimes realized by processing in conjunction with an operating system, another application program, or the like, based on an instruction of the program. Furthermore, for distribution on the market, the program can be distributed by storing the program in a portable recording medium, or can be transferred to a server computer connected through a network such as the Internet. In this case, a storage device of the server computer is also included in the present invention.

In addition, a part of or the whole of the mobile station apparatus and the base station apparatus in the above embodiments may be realized as an LSI, typically, which is an integrated circuit. Each function block of the mobile station apparatus and the base station apparatus may be individually made into chips, and some or all the function blocks may be made into chips in an integrated manner. Furthermore, the method of realizing the integrated circuit is not limited to the use of the LSI and may be realized by using a dedicated circuit or a general-purpose processor. Moreover, when an integrated circuit technique replacing the LSI appears with the development of the semiconductor technology, an integrated circuit by the involved technology can be used.

while, hereinabove, the embodiments of this invention have been described with reference to the drawings, a specific configuration is not limited to these embodiments, and a design and the like in a range without departing from the gist of this invention is also included in the claims.

EXPLANATION OF THE REFERENCE NUMERAL

103 Reception antenna
104 Reception processing section
105 Band allocation information acquisition section
108 (108-1, 108-2) PA section
109 (109-1, 109-2) Transmission antenna
1041 Format information acquisition section
201 (201-1, 201-2) Reception antenna
209 Band allocation determination section
212 Transmission antenna
210 Control information generation section
402 PMI information acquisition section
403 (403-1, 403-2) Pre-coding section
501 Signal separation section
502 Pre-coding determination section
601 Control information generation section
602 Transmission processing section
701 (701-1, 701-2) Transmission signal processing section
801 (801-2) PA section
802 (802-2) Transmission antenna
803 (803-2, 803-3) IDFT section

The invention claimed is:

1. A transmission apparatus comprising:
PAs (Power Amplifiers) configured to include at least a first PA and a second PA, the first PA being requested a data transmission using a plurality of subcarriers indicated by a first format and the second PA being requested the data transmission using a plurality of subcarriers indicated by a second format; and
a decoding section configured to perform a blind decoding of control information indicating one of first control information and second control information for CC (component carrier) to be used the first PA, or configured to perform the blind decoding of the control information indicating the first control information for CC to be used the second PA, wherein
the first format indicates a format for allocating to two or more contiguous subcarriers,
the second format indicates a format for allocating at a first cluster and a second cluster, the first cluster including a first portion of the plurality of subcarriers continuously allocated to form the first cluster and the second cluster including a second portion of the plurality of subcarriers continuously allocated to form the second cluster,
the first control information indicates one of the first format and the second format, and
the second control information indicates the first format.

2. The transmission apparatus according to claim 1, wherein the control information is set each of CCs.

3. The transmission apparatus according to claim 1, wherein the minimum number of resource blocks is set each of CCs, in case that the decoding section is configured to perform a blind decoding of the first control information, wherein
each of the first cluster and the second cluster is comprised of one or more resource blocks.

4. The transmission apparatus according to claim 3, wherein the minimum number of resource blocks is set based on the number of resource blocks capable of being allocated within the CC.

5. The transmission apparatus according to claim 1, wherein, in case of performing the data transmission using at least a first CC and a second CC, a PAPR characteristics of transmission signals for the first CC differs from a PAPR characteristics of transmission signals for the second CC.

6. The transmission apparatus according to claim 1, wherein the a capability of the first PA differs from a capability of the second PA.

7. A base station apparatus comprising:
a transmission antenna configured to transmit, to a transmission apparatus that transmits transmission signals using a plurality of subcarriers indicated by a first format, control information indicating one of first control information and second control information, and, to a transmission apparatus that transmits the transmission signals using a plurality of subcarriers indicated by a second format, the control information indicating the first control information, wherein
the first format indicates a format for allocating to two or more contiguous subcarriers,
the second format indicates a format for allocating at least a first cluster and a second cluster, the first cluster including a first portion of the plurality of subcarriers continuously allocated to form the first cluster and the second cluster including a second portion of the plurality of subcarriers continuously allocated to form the second cluster,
the first control information indicates one of the first format and the second format, and
the second control information indicates the first format.

8. The base station apparatus according to claim 7, wherein the control information is set for each of CCs, each of the CCs being used for transmitting transmission signals by a transmission apparatus.

9. The base station apparatus according to claim 7, wherein the minimum number of resource blocks is set for each of CCs, each of the CCs being used for transmitting transmission signals by a transmission apparatus, in case that the transmission antenna is configured to transmit the control information including the second format, wherein
each of the first cluster and the second cluster is comprised of one or more resource blocks.

10. The base station apparatus according to claim 9, wherein the minimum number of resource blocks is set based on the number of resource blocks capable of being allocated within the CC.

11. A method of a transmission apparatus, the method comprising:
transmitting data using a plurality of subcarriers indicated by one of a first format and a second format; and
performing a blind decoding of control information indicating one of first control information and second control information for CC (component carrier) to be used a first PA, or performing the blind decoding of the control information indicating the first control information for CC to be used a second PA, wherein
the first format indicates a format for allocating to two or more contiguous subcarriers,
the second format indicates a format for allocating at a first cluster and a second cluster, the first cluster including a first portion of the plurality of subcarriers continuously allocated to form the first cluster and the second cluster including a second portion of the plurality of subcarriers continuously allocated to form the second cluster,
the first PA is requested a data transmission using the plurality of subcarriers indicated by the first format,
the second PA is requested the data transmission using the plurality of subcarriers indicated by the second format,
the first control information indicates one of the first format and the second format, and
the second control information indicates the first format.

12. A method of a base station apparatus, the method comprising:
transmitting, to a transmission apparatus that transmits transmission signals using a plurality of subcarriers indicated by a first format, control information indicating one of first control information and second control information, and, to a transmission apparatus that transmits the transmission signals using a plurality of subcarriers indicated by a second format, the control information indicating the first control information, wherein
the first format indicates a format for allocating to two or more contiguous subcarriers,
the second format indicates a format for allocating at least a first cluster and a second cluster, the first cluster including a first portion of the plurality of subcarriers continuously allocated to form the first cluster and the second cluster including a second portion of the plurality of subcarriers continuously allocated to form the second cluster,
the first control information indicates one of the first format and the second format, and
the second control information indicates the first format.

* * * * *